(12) United States Patent
Schouenborg

(10) Patent No.: US 12,465,289 B2
(45) Date of Patent: Nov. 11, 2025

(54) METHOD OF IMPLANTATION OF A MEDICAL DEVICE INTO NEURAL TISSUE

(71) Applicant: NEURONANO AB, Karlshamn (SE)

(72) Inventor: Jens Schouenborg, Lund (SE)

(73) Assignee: NEURONANO AB (SE)

( * ) Notice: Subject to any disclaimer, the term of this patent is extended or adjusted under 35 U.S.C. 154(b) by 69 days.

(21) Appl. No.: 18/593,319

(22) Filed: Mar. 1, 2024

(65) Prior Publication Data
US 2024/0252113 A1 Aug. 1, 2024

Related U.S. Application Data

(62) Division of application No. 15/505,987, filed as application No. PCT/SE2015/000050 on Aug. 28, 2015, now abandoned.

(30) Foreign Application Priority Data

Aug. 27, 2014 (SE) ................................. 1400407-1

(51) Int. Cl.
A61B 17/00 (2006.01)
A61B 5/00 (2006.01)
(Continued)

(52) U.S. Cl.
CPC .......... *A61B 5/6847* (2013.01); *A61B 5/4064* (2013.01); *A61B 5/407* (2013.01);
(Continued)

(58) Field of Classification Search
CPC ........ A61B 17/3421; A61B 2017/3429; A61B 5/0478; A61B 5/04001; A61B 5/0006;
(Continued)

(56) References Cited

U.S. PATENT DOCUMENTS 6,205,359 B1  3/2001  Boveja ........................... 607/45
6,772,694 B1  8/2004  Pearce, III et al. ........... 102/370
(Continued)

FOREIGN PATENT DOCUMENTS

WO  WO 2007/028003 A2  3/2007
WO  WO 2009/075625 A1  6/2009
WO  WO 2013/191612 A1  12/2013

OTHER PUBLICATIONS

International Search Report mailed Dec. 1, 2015 in corresponding PCT International Application No. PCT/SE2015/000050.
(Continued)

*Primary Examiner* — Joseph A Stoklosa
*Assistant Examiner* — Brian M Antiskay
(74) *Attorney, Agent, or Firm* — OSTROLENK FABER LLP

(57) ABSTRACT

A method of providing a channel in nervous tissue filled with an aqueous gel for implantation of a microelectrode or other medical device lacking sufficient physical stability for direct implantation by insertion, comprises providing an apparatus comprising an oblong rigid pin covered by a dry gel forming agent; locating a target in the tissue; defining a straight insertion path a desired tissue insertion point and the target; aligning the pin with its end foremost with the insertion path; inserting the pin into the tissue to a position near or at the target; allowing sufficient time to pass for a gel to be formed around the pin, withdrawing the pin. Also disclosed is a corresponding channel; a method of implantation of a microelectrode or microprobe into nervous tissue via the channel; a corresponding method of implantation of living cells; a corresponding apparatus for forming the channel.

19 Claims, 9 Drawing Sheets

Figure 1B:
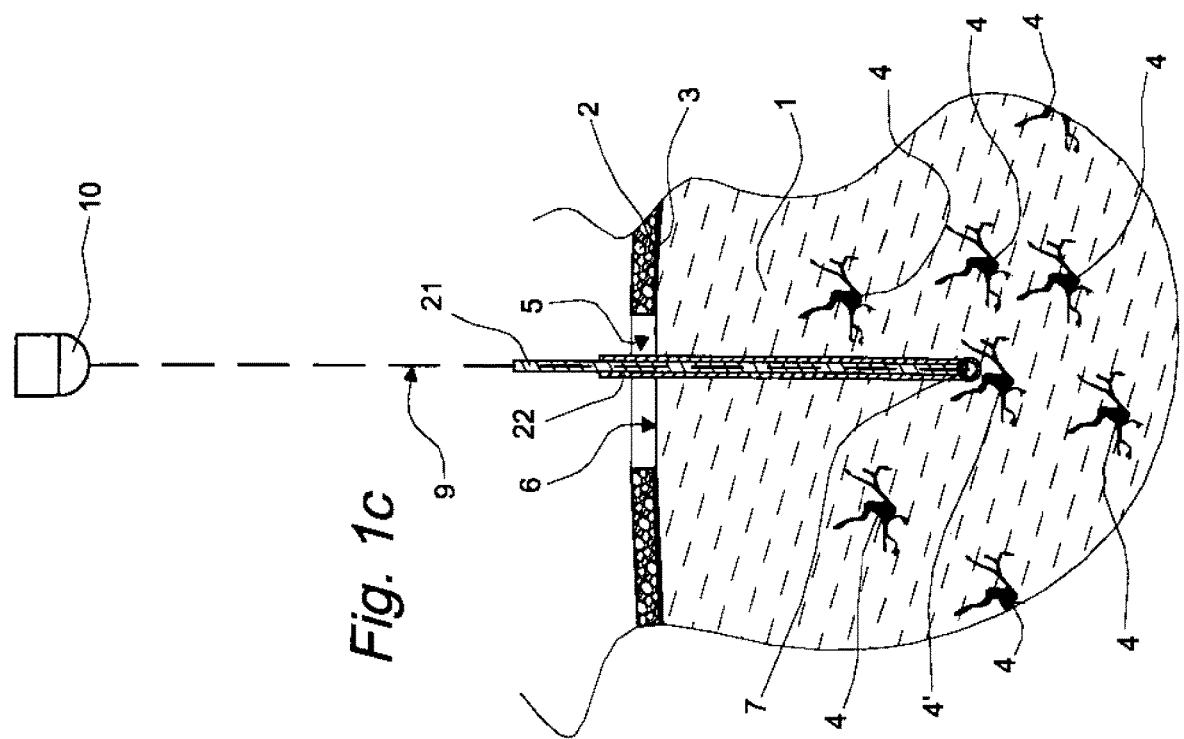

(51) Int. Cl.
  *A61B 5/05* (2021.01)
  *A61B 17/34* (2006.01)
  *A61L 31/02* (2006.01)
  *A61L 31/04* (2006.01)
  *A61L 31/10* (2006.01)
  *A61L 31/14* (2006.01)
  *A61L 31/16* (2006.01)
  *A61B 90/13* (2016.01)

(52) U.S. Cl.
  CPC ........ *A61B 5/6846* (2013.01); *A61B 17/3468* (2013.01); *A61L 31/022* (2013.01); *A61L 31/048* (2013.01); *A61L 31/10* (2013.01); *A61L 31/148* (2013.01); *A61L 31/16* (2013.01); *A61B 2017/00849* (2013.01); *A61B 90/13* (2016.02); *A61B 2560/063* (2013.01); *A61B 2562/028* (2013.01); *A61L 2420/08* (2013.01); *A61L 2430/32* (2013.01)

(58) Field of Classification Search
  CPC ... A61B 5/0024; A61B 5/04; A61B 2562/125; A61B 2562/046; A61B 2562/164; A61B 5/165; A61B 5/686; A61B 5/6868; A61B 2018/00839; A61B 5/4094; A61B 5/0402; A61B 5/048
  USPC ........ 600/372–373, 377–378, 382–383, 393, 600/544–545; 607/115–118
  See application file for complete search history.

(56) References Cited

U.S. PATENT DOCUMENTS

| | | | | |
|---|---|---|---|---|
| 7,010,356 | B2 | 3/2006 | Jog et al. | 600/373 |
| 8,224,417 | B2 | 7/2012 | Vetter | 607/116 |
| 8,442,614 | B2 | 5/2013 | Schulman | 600/378 |
| 9,474,894 | B2 | 10/2016 | Mercanzini et al. | |
| 2003/0069560 | A1 | 4/2003 | Adamis et al. | 604/521 |
| 2004/0215162 | A1 | 10/2004 | Putz | 604/500 |
| 2004/0220545 | A1 | 11/2004 | Heruth et al. | 604/508 |
| 2005/0256452 | A1* | 11/2005 | DeMarchi | A61M 25/0147 604/95.04 |
| 2008/0177363 | A1 | 7/2008 | Schouenborg | 607/116 |
| 2008/0234790 | A1 | 9/2008 | Bayer et al. | 607/116 |
| 2009/0043369 | A1 | 2/2009 | Radeloff | 607/137 |
| 2009/0112273 | A1 | 4/2009 | Wingeier et al. | 607/3 |
| 2009/0112278 | A1 | 4/2009 | Wingeier et al. | 607/45 |
| 2009/0132042 | A1 | 5/2009 | Hetke et al. | 623/23.72 |
| 2010/0100045 | A1* | 4/2010 | Pravongviengkham | A61B 17/3421 604/164.01 |
| 2010/0241100 | A1 | 9/2010 | Blumenfeld et al. | 600/584 |
| 2011/0087315 | A1 | 4/2011 | Richardson-Burns et al. | 607/116 |
| 2012/0123318 | A1 | 5/2012 | Ek et al. | 604/20 |
| 2013/0131485 | A1 | 5/2013 | Oh et al. | 600/393 |
| 2013/0144370 | A1 | 6/2013 | Debruyne et al. | 607/137 |
| 2016/0166803 | A1 | 6/2016 | Masi et al. | 607/116 |
| 2020/0188660 | A1* | 6/2020 | Franke | A61N 1/36071 |

OTHER PUBLICATIONS

Written Opinion mailed Dec. 1, 2015 in corresponding PCT International Application No. PCT/SE2015/000050.

G. Lind et al., "Gelatine-embedded electrodes—a novel biocompatible vehicle allowing implantation of highly flexible microelectrodes," Journal of Neural Engineering, vol. 7, 10 pages (2010).

G. Lind et al., "The density difference between tissue and neural probes is a key factor for glial scarring," Journal of Scientific Reports, vol. 3, 7 pages (2013).

Gustav Lind et al: "Gelatine-embedded electrodes-a novel biocompatible vehicle allowing implantation of highly flexible microelectrodes", Journal of Neural Engineering, 7(4), [046005], DOI: 10.1088/1741-2560/7/4/046005, (2010), pp. 1-14.

* cited by examiner

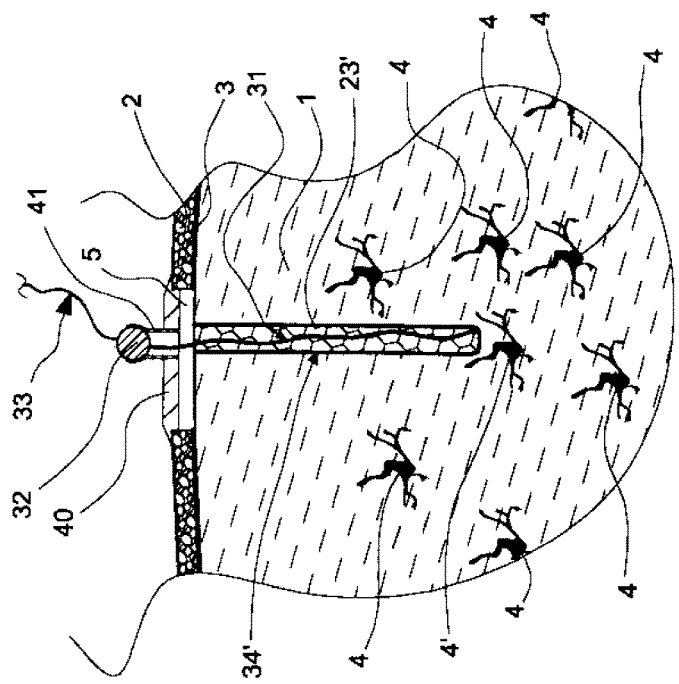
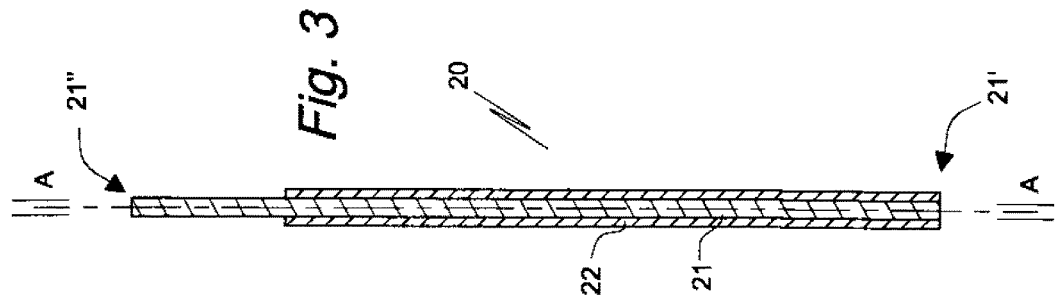
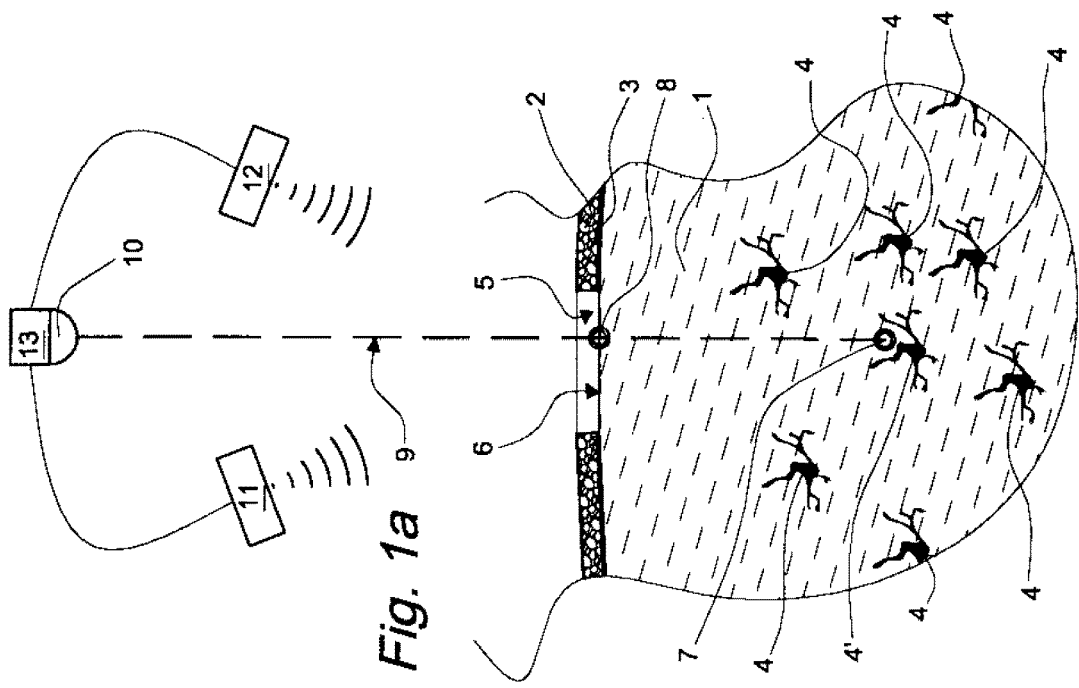

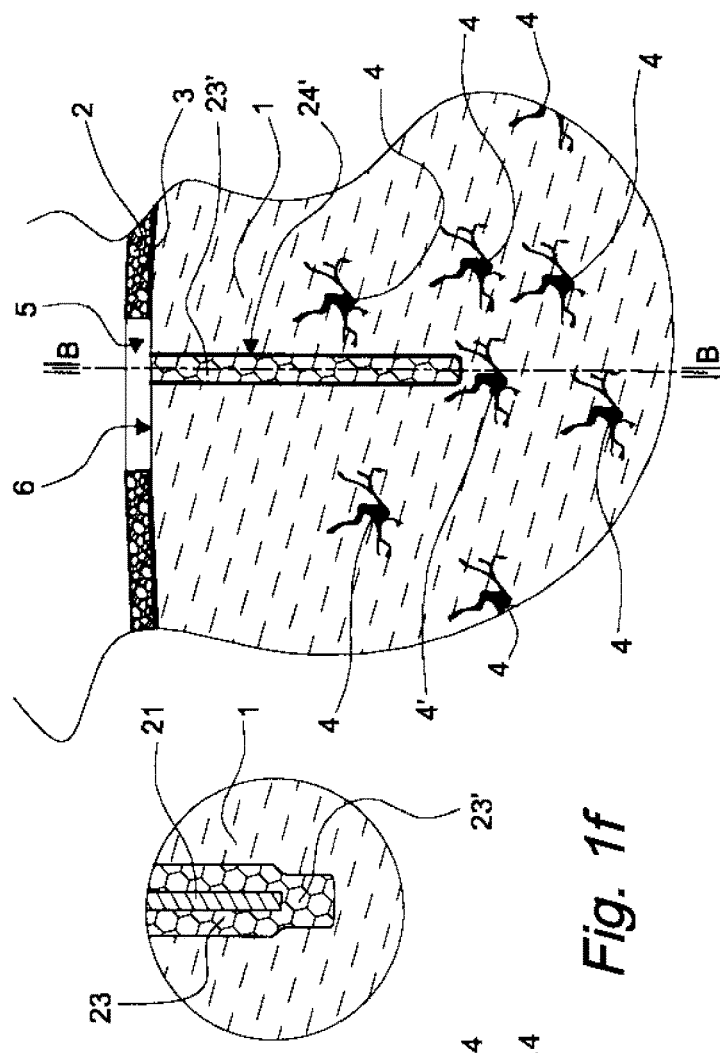
Fig. 1e
Fig. 1f
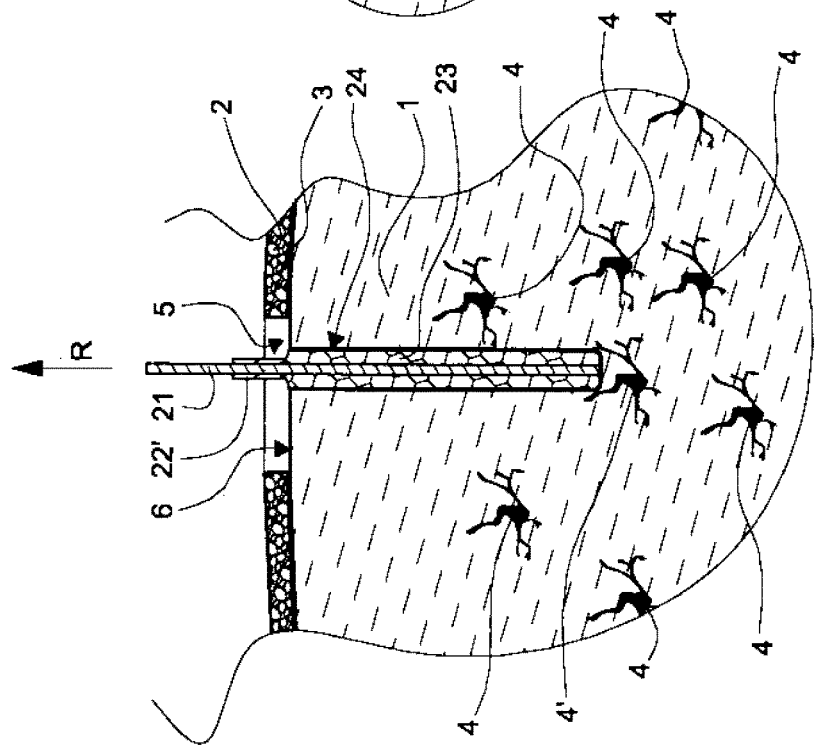
Fig. 1d

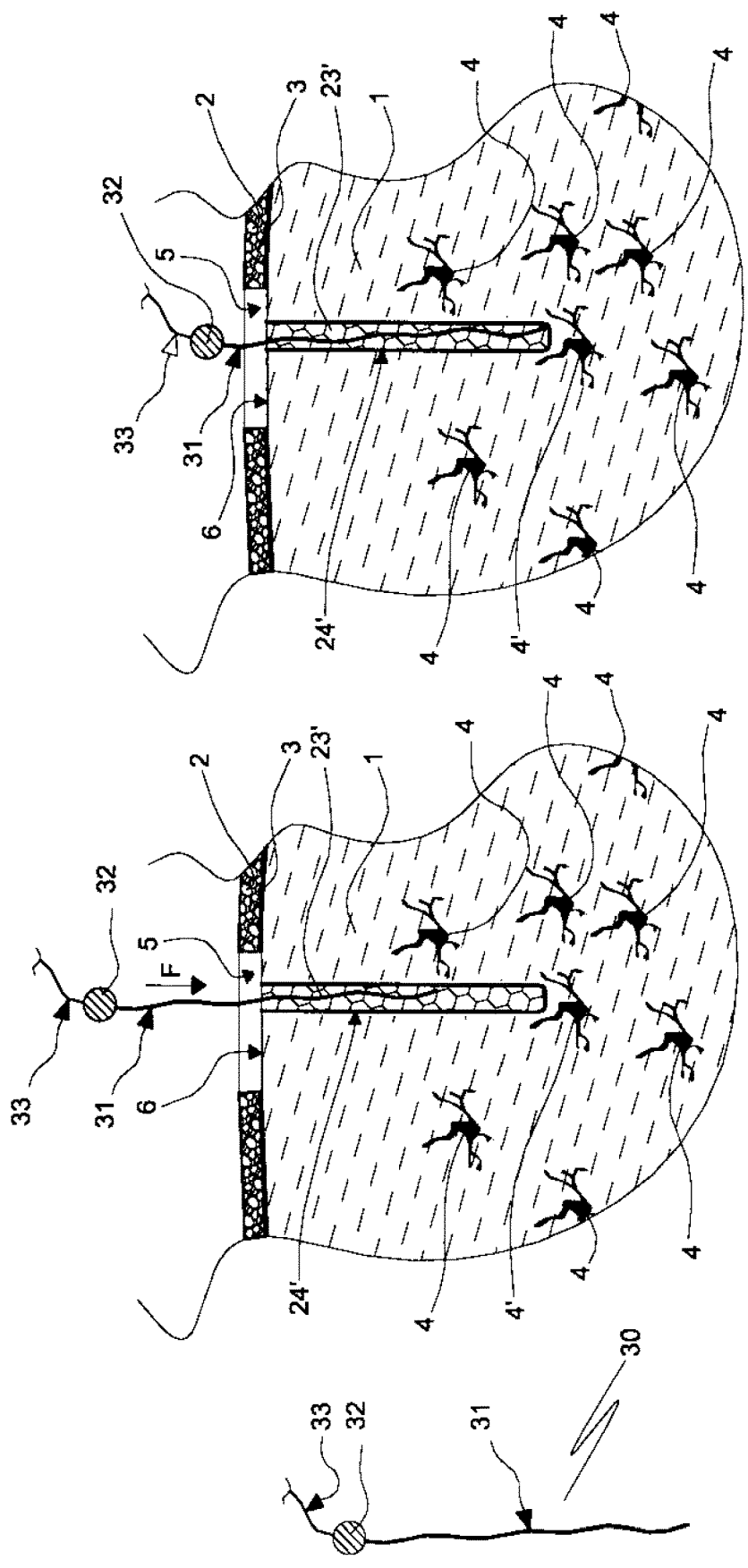

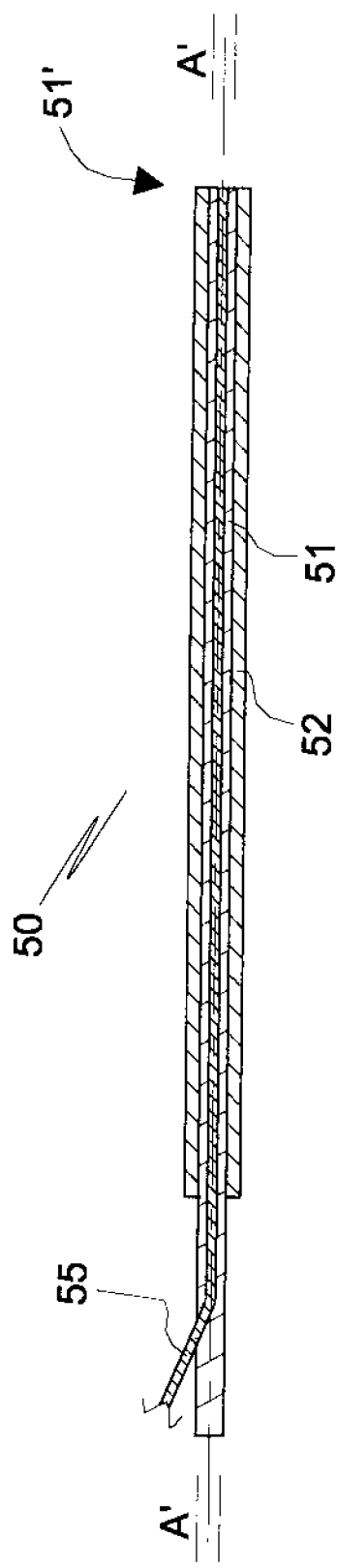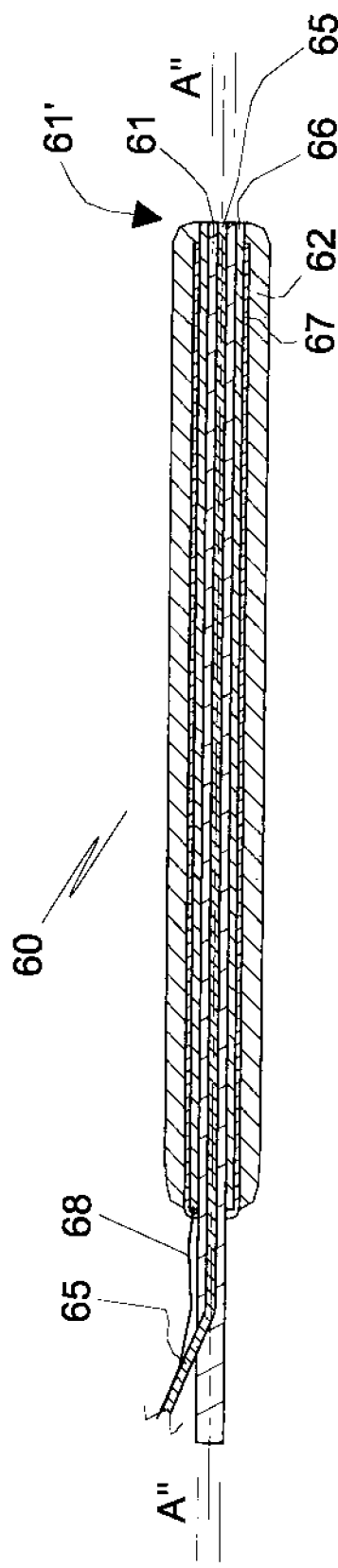

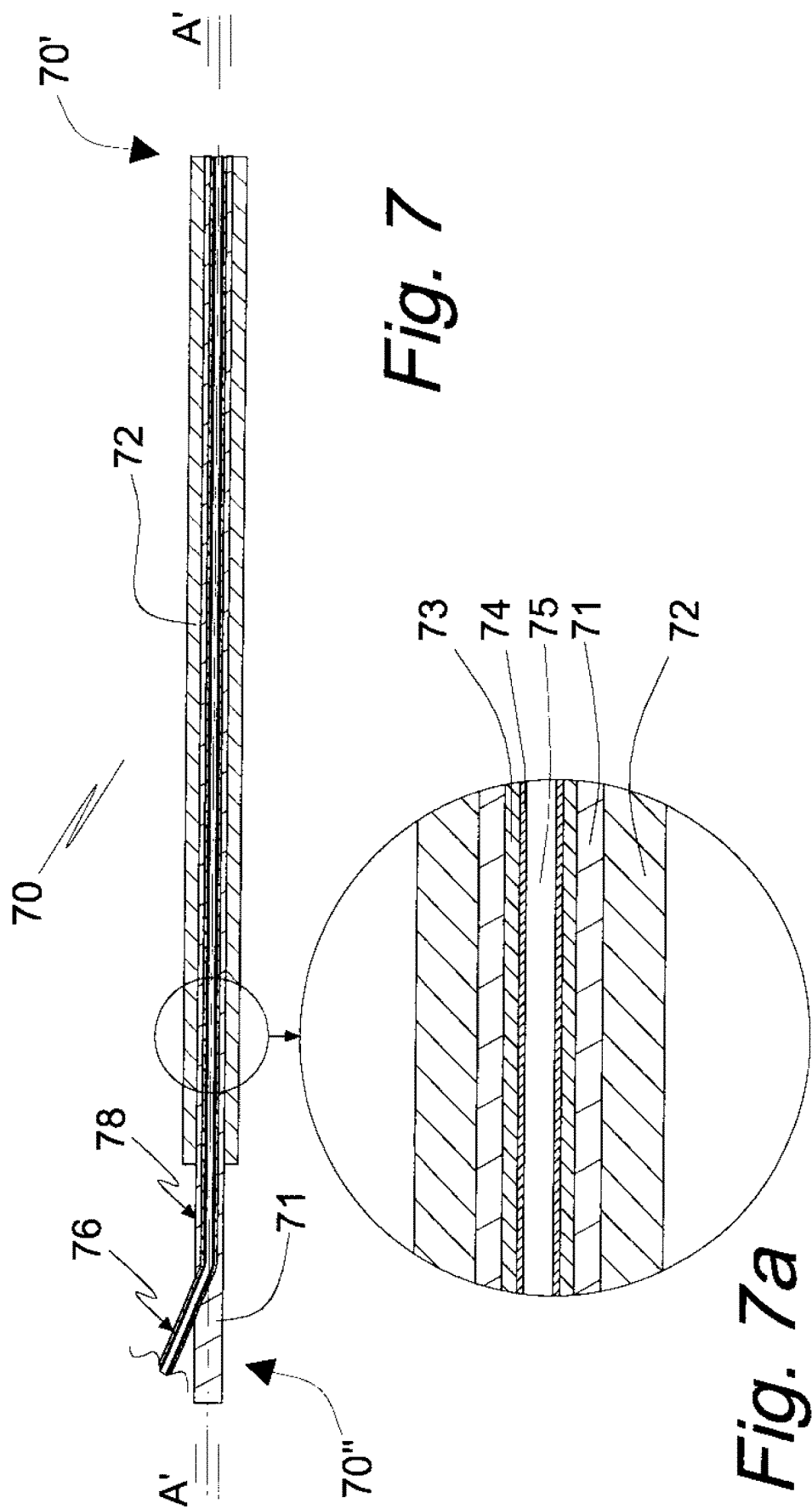

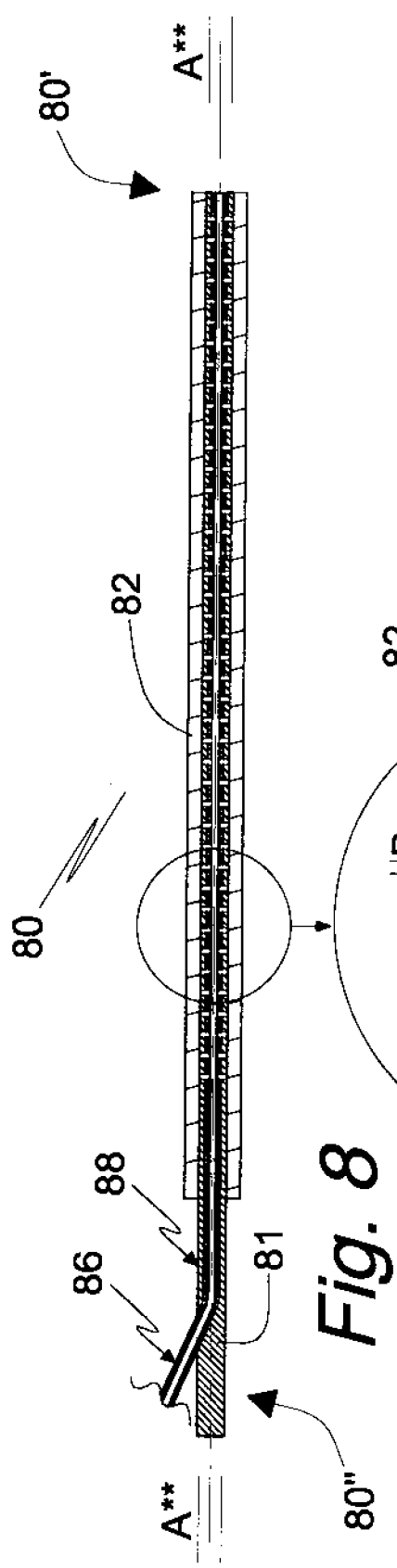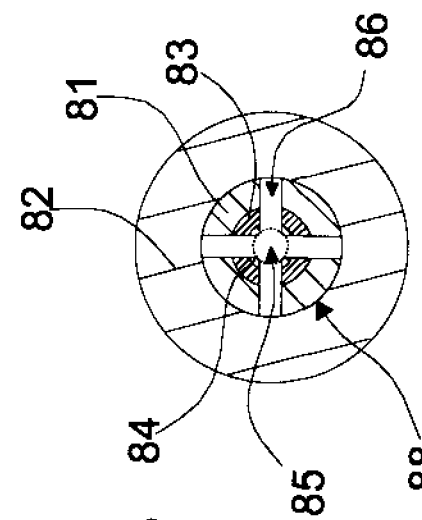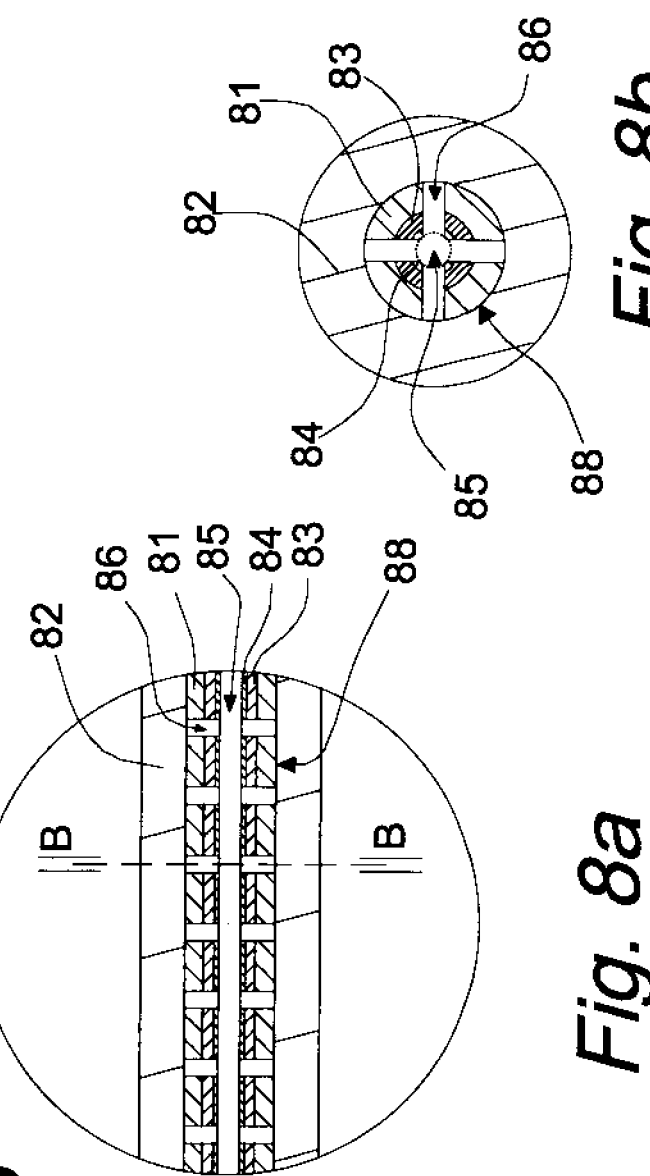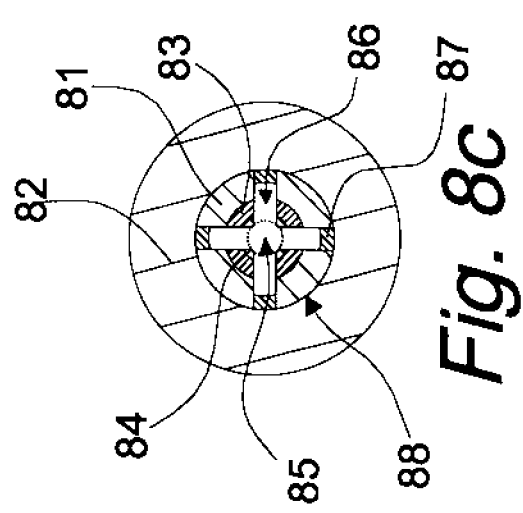

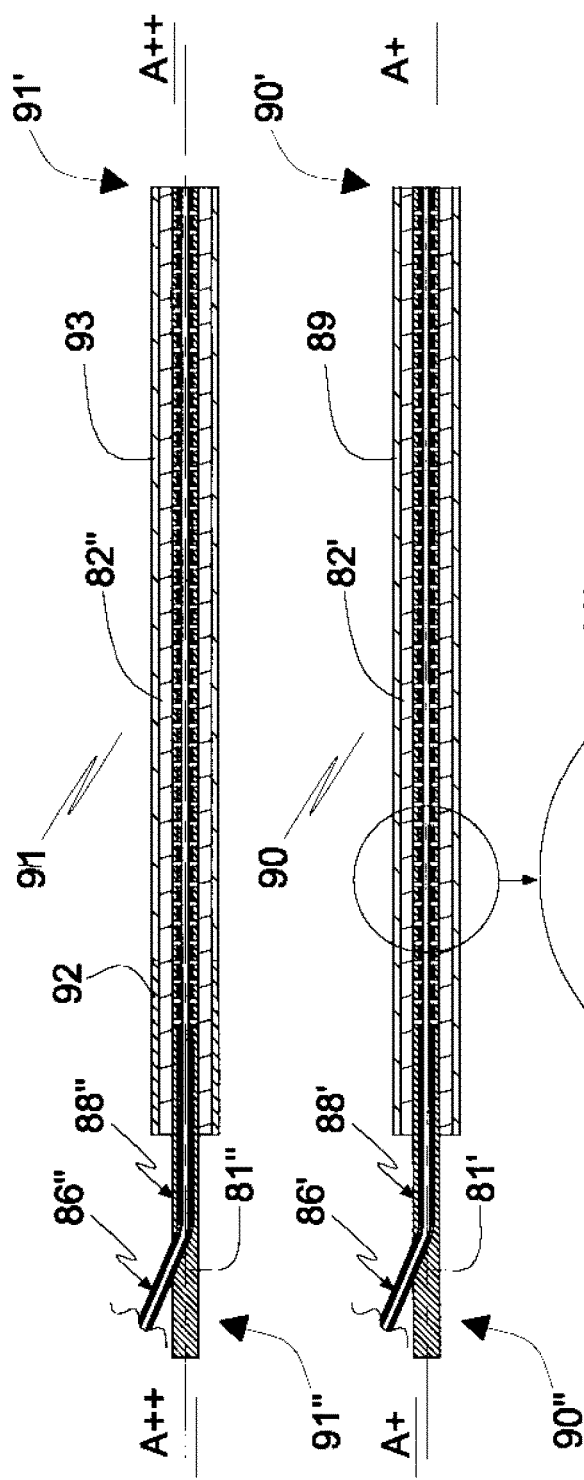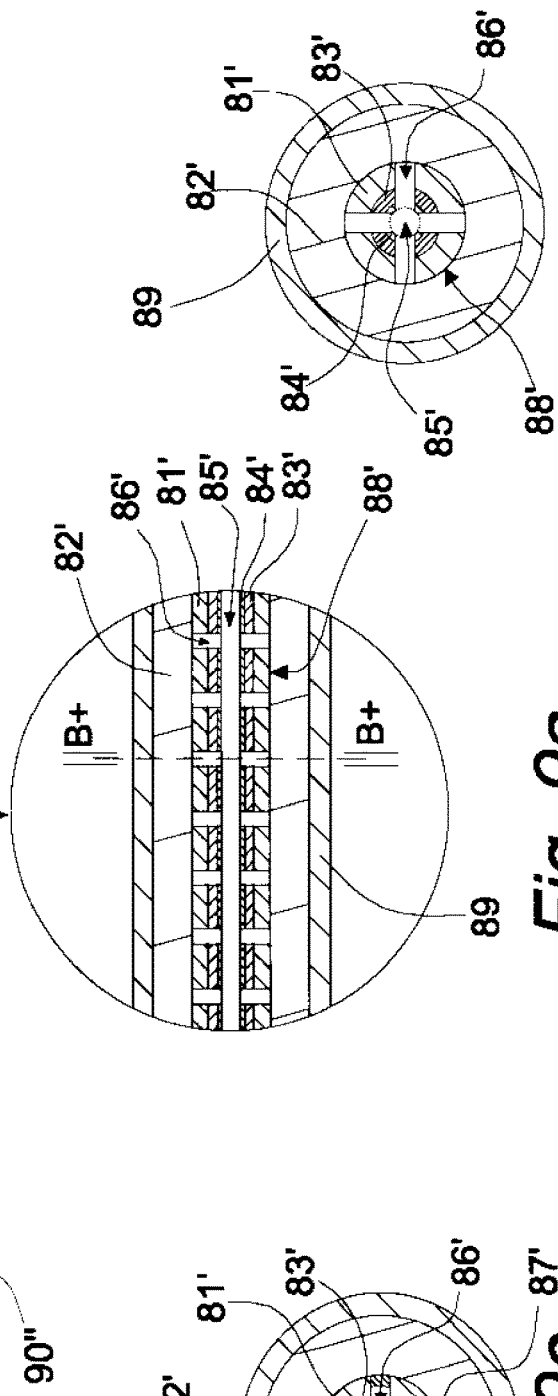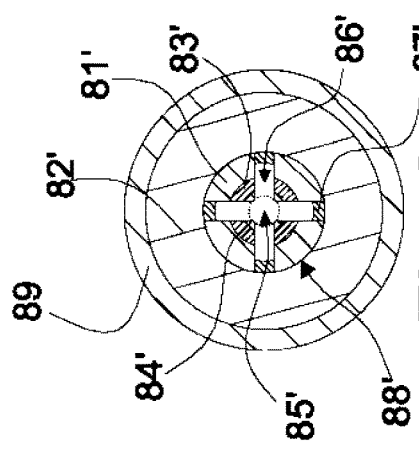

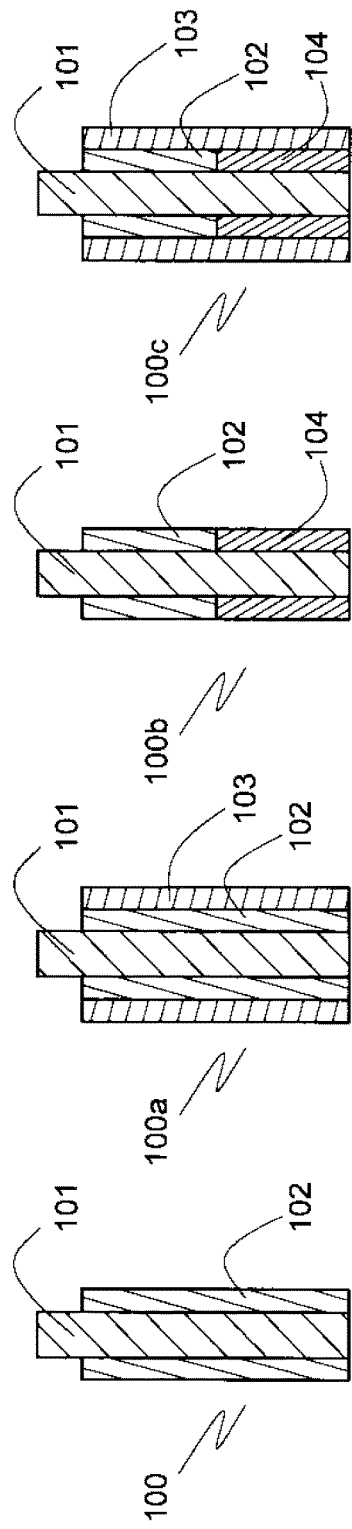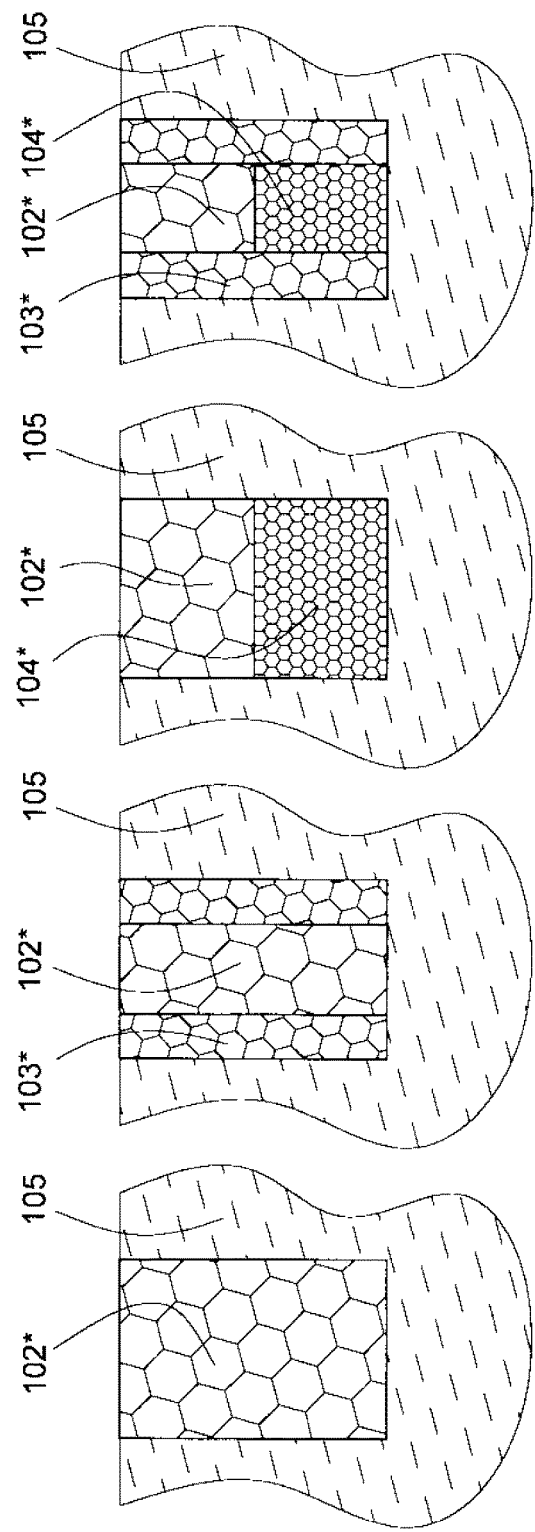

METHOD OF IMPLANTATION OF A MEDICAL DEVICE INTO NEURAL TISSUE

CROSS-REFERENCE TO RELATED APPLICATIONS

The present application is a divisional under 37 C.F.R. § 1.53(b) of prior U.S. patent application Ser. No. 15/505,987, filed Feb. 23, 2017, in the name of Jens SCHOUENBORG and entitled METHOD OF IMPLANTATION OF A MEDICAL DEVICE INTO NEURAL TISSUE, which is a 35 U.S.C. §§ 371 national phase conversion of PCT/SE2015/000050, filed Aug. 28, 2015, which claims priority of Swedish Patent Application No. 1400407-1, filed Aug. 27, 2014, the contents of which are incorporated by reference herein. The PCT International Application was published in the English language.

FIELD OF THE INVENTION

The present invention relates to a method of implanting a medical device or other object such as living cells into soft tissue, in particular nervous tissue, of a person or mammal. Furthermore, the present invention relates to a corresponding means, to a method of providing such means, and to an apparatus for use in such provision. The medical device or other object to which the invention relates is one that is not sufficiently physically stable for direct implantation by insertion into the tissue. In particular, the medical device of the invention is a microelectrode or a microprobe such as an electrical or optical sensor.

BACKGROUND OF THE INVENTION

Devices for implantation into soft tissue comprise microelectrodes. Microelectrodes have a wide field of application in medicine and related fields. In principle, electric signals emanating from single nerve cells or group of cells can be recorded. Single nerve cells or group of cells can also be electrically stimulated by such devices, and their reaction to such stimulation monitored. This allows a user to select nuclei whose stimulation produces a therapeutic effect. Selective stimulation can be expected to produce a result superior to non-selective stimulation. Stimulation of the brain or spinal cord can be of particular value in situations when brain nuclei are degenerated or injured. Monitoring brain activity through implanted devices can be used to control drug delivery locally or systemically or to control electrical stimulation of brain nuclei. In this application, microelectrodes are flexible electrodes comprising an oblong electrode body having a diameter in the sub-millimeter range, in particular in the 1 µm to 100µ, which is not stiff enough for precise insertion into nervous tissue or easily is deflected from a desired path of insertion during insertion. In the art this problem is solved by enclosing the electrode body or at least a portion thereof extending from its distal end or tip in a proximal direction with a stiff matrix, which is dissolved or degrades by aqueous nervous or body fluid at a rate substantially lower than the rate of insertion. Physically insufficiently stable devices for implantation into soft tissue furthermore comprise sensors of various kind, such as glucose sensors, which can be used for controlling administration of insulin, and radiative sensors comprising optical fibers.

The high local concentration of matrix fragments caused by dissolution or degradation is problematic. It changes temporarily the natural environment of a targeted nerve cell or a group of nerve cells, and thereby affects their behavior until matrix solutes have been transported away from the site of insertion. The removal of matrix solutes from the site of insertion by convection or diffusion is time consuming. Until all or practically all such solutes have been removed the electrode cannot be used or can only be used for monitoring a nerve cell or a group of nerve cells under the influence of such solutes. Single electrodes and groups of electrodes comprising a tiny oblong metallic electrode body enclosed by a biodissolvable or biodegradable matrix are disclosed in, for instance, WO2009/075625 A1.

Another problem is that, in order to being sufficiently rigid for insertion into tissue, the matrix need to be of a radial dimension substantially larger than that of the electrode body. This requirement may result in electrode body/matrix combinations of a radial dimension causing substantial injury to the tissue into which the combination is inserted.

Still another problem is that, due to variation in functional organization and anatomy of tissue, in particular brain tissue, between subjects, optimal placement of microelectrodes in the tissue may require repetitive insertion and evaluation of the corresponding disposition. Matrix covered microelectrodes of the art are not well adapted to repetitive insertion since they will lose some of their matrix material in each insertion and, at worst, will lose so much thereof that their rigidity will be compromised before a desired disposition in the tissue can be obtained. This may be accompanied by loss of pharmaceutical(s) or biological material incorporated in their matrix, which material may negatively affect the tissue of interest.

An additional problem or limitation of matrix covered microelectrodes resides in their limited rate of insertion into soft tissue: to avoid excessive tissue injury the microelectrodes have to be inserted rather slowly. The more slowly they are inserted the higher is the risk of matrix material and, if present, pharmaceutical(s) or other agents incorporated into the matrix being lost during insertion on the way and not reaching the desired disposition for release. This problem is particularly evident with probes comprising frozen biological material.

A further problem with the insertion of matrix-covered microelectrodes of the art is bleeding of the wound caused by the microelectrode. This may lead to local coagulated blood sticking to the matrix surface will substantially delay the dissolution or degradation thereof, and thereby the use of the microelectrode for the intended purpose.

An additional important problem is nervous tissue irritation caused by the implants such as microelectrodes resulting in loss of neurons and proliferation of astrocytes (Lind G et al., J Scientific Reports 3 (2013); article no. 2942DOI: doi:10.1038/srep02942).

Gelatin-embedded electrodes implanted in brain tissue are disclosed in G Lind et al., J Neural Eng 7 (2010) 046005 (doi:10.1088/1741-2560/7/4/046005). Gelatin-embedded metal microelectrodes or bundles of microelectrodes implanted into the brain show improved functionality over extended periods of time accompanied by reduced acute tissue reactions.

OBJECTS OF THE INVENTION

A primary object of the invention is to provide a method of the aforementioned kind that solves one or several problems related to the insertion of known microelectrodes and other objects into neural tissue. Neural tissue comprises brain and spinal cord tissue but also peripheral nerves, dorsal root ganglia, and retina tissue.

Other objects of the invention are to prevent or reduce or stop bleeding along a neural tissue insertion path for a medical device or other object; to protect neighboring nerve cells from negative effects of such implantation; to the preservation of the capacity of correcting the disposition of implanted microelectrodes and other objects.

Another object of the invention is to provide an apparatus for use in the method.

A further object of the invention is to provide a method of manufacture of the apparatus.

Additional objects of the invention will become apparent from the following summary of the invention, the description of preferred embodiments thereof illustrated in a drawing, and from the appended claims.

SUMMARY OF THE INVENTION

The present invention is based on the insight that the provision of a channel in neural tissue filled with a biocompatible aqueous gel such as aqueous gelatin gel allows implantation by insertion into neural tissue of medical devices or other objects that are insufficiently physically stable for direct insertion into neural tissue. Neural tissue comprises brain and spinal cord tissue.

The channel of the invention is preferably rotationally symmetric, more preferred cylindrical and has a corresponding central, longitudinally extending axis. The channel of the invention is preferably straight or substantially straight, that is, linear or substantially linear. Substantially linear/straight means that when its one end is disposed on the central axis a straight line passing through its other end forms an angle with the central axis of not more than 10° with the axis, preferably of not more than 5°. The channel of the invention has a length substantially greater than its width, in particular by a factor of 5 or 10 or 20 and more. The side and bottom (front) walls of the channel are formed by living nervous tissue. For this and other reasons the geometry of the channel may change over time. In particular, the diameter of the channel may shrink over time.

The biocompatible gel prevents shrinkage of the channel radially inwardly and thus stabilizes the geometry of the channel, at least for a period of time during which the gel is not substantially altered, that is, weakened by enzymatic degradation or otherwise. The use of cross-linked gels may extend the time of substantially stabilized geometry, which can be tailored by the extent of crosslinking.

The biocompatible gel allows tiny structures like thin filaments or electrodes or optical fibers to be inserted into it, in particular slowly inserted into it, without substantially affecting their geometry. A slow rate of insertion is a rate of up to 5 mm per second, in particular of 1 or 2 mm per second. This is in stark contrast to the resistance of soft tissue, in particular nervous tissue, to such insertion. Typically, the resistance of an aqueous gel of the invention is lower by a factor of 10 or more, in particular by a factor of 25 or more than the resistance of neural tissue, in particular the meningeus and other fibrous membrane layers. A measure of the resistance against penetration is the time required for an oblong pin of given dimensions to penetrate to a defined depth under the influence of a constant force acting on the pin in an axial distal direction.

The biocompatible gel is translucent, which is particularly advantageous for the use of visible and near IR radiation emitted through an optical fiber disposed in the channel.

The present invention is also based on the insight that insertion of matrix stabilized microelectrodes or probes of the art can be improved by the method of the invention. The provision of a channel of the aforementioned kind may reduce, even substantially reduce, the amount of matrix material dissolvable or degradable by body fluid required for their stabilization during insertion into soft tissue.

The aqueous gel of the invention is formed in situ by contact of a gel forming agent with an aqueous media, in particular with aqueous body fluid. For forming the channel of the invention the gel forming agent is preferably used in a dry state, such as in a state comprising less than 20% by weight, in particular less than 10% or 5% by weight of water.

A preferred aspect of the present invention is based on the additional insight that the formation of aqueous biocompatible gel, in particular of aqueous gelatin gel, in the channel can have neuroprotective effect comprising reduction of microglia response to medical devices implanted into neural tissue.

According to the present invention gelatin from various animal sources can be used as a gel forming agent, such as bovine, pig skin, poultry skin, and tuna gelatin. Gelatin from mammal sources is preferred due to its superior gelling capacity at body temperature. For forming a channel of extended stability the use of chemically cross-linked gelatin is preferred due to its slower rate of degradation in the body. Examples of efficient gelatin cross linking agents are bis (vinylsulfonyl)methane and 1-ethyl-3(3-dimethylaminopropyl)carbodiimide. Another useful crosslinking method is by UV radiation. The rate of degradation in the body can be controlled by the extent of cross-linking, which in turn can be controlled by the amount of cross-linking agent used or by controlling the exposure to UV radiation used for cross-linking a given amount of gelatin.

Other aqueous biocompatible gels of the invention include carbohydrate gels. Carbohydrate gels useful in the invention include arabinogalactan gel, arabinoxylan gel, galactan gel, galactomannan gel, lichenan gel, xylan gel but also cellulose derivatives such as hydroxymethylpropyl cellulose, and are formed by contact with aqueous media, in particular aqueous body fluid, with a gel forming agent selected from: arabinogalactan, arabinoxylan, galactan, galactomannan, licenan, xylan, hydroxymethyl cellulose and other cellulose derivatives forming gels in contact with aqueous media.

Further aqueous biocompatible gels of the invention include protein gels. Protein gels other than gelatin from animal sources useful in the invention include whey protein gel, soy protein gel, casein gel, which are formed by contact of aqueous media, in particular aqueous body fluid with a gel forming agent selected from whey protein, soy protein, casein.

Still other aqueous gels for use in the invention can be formed by contact of aqueous media, in particular aqueous body fluid, with a gel forming agent selected from the group consisting of: arabinogalactan; arabinoxylan; galactan; galactomannan; lichenan; xylan; cellulose derivatives such as hydroxymethylpropyl cellulose; whey protein; soy protein; casein; hyaluronic acid; chitosan; gum Arabic; carboxyvinyl polymer; sodium polyacrylate; carboxymethyl cellulose; sodium carboxymethyl cellulose; pullulan; polyvinylpyrrolidone; karaya gum; pectin; xanthane gum; tragacanth; alginic acid; polyoxymethylene; polyimide; polyether; chitin; poly-glycolic acid; poly-lactic acid; co-polymer of poly-glycolic and poly-lactic acid; co-polymer of poly-lactic acid and polyethylene oxide; polyamide; polyanhydride; polycaprolactone; maleic anhydride copolymer;

poly-hydroxybutyrate co-polymer; poly(1,3-bis(p-carbophenoxy)propane anhydride); polymer formed by co-polymerization with sebacic acid or with poly-terephthalic acid; poly(glycolide-co-trimethylene carbonate); polyethylene glycol; polydioxanone; polypropylene fumarate; poly(ethyl glutamate-co-glutamic acid); poly(tert-butyloxy carbonylmethyl glutamate); poly-caprolactone; poly(caprolactone-co-butylacrylate); poly-hydroxybutyrate and copolymers thereof; poly(phosphazene); poly(D,L-lactide-co-caprolactone); poly(glycolide-co-caprolactone); poly(phosphate ester); poly(amino acid); poly(hydroxybutyrate); polydepsidpeptide; maleic anhydride copolymer; polyphosphazene; polyiminocarbonate; poly[(7.5% dimethyl-trimethylene carbonate)-co-(2.5% trimethlyene carbonate)]; polyethylene oxide; hydroxypropylmethylcellulose, poly(ethylene-co-vinyl acetate); isobutylene-based copolymer of isobutylene and at least one other repeating unit such as butyl acrylate: butyl methacrylate; substituted styrene such as amino styrene, hydroxy styrene, carboxy styrene, sulfonated styrene; homopolymer of polyvinyl alcohol; co-polymer of polyvinyl alcohol and at least one other repeating unit such as a vinyl cyclohexyl ether; hydroxymethyl methacrylate; hydroxyl- or amino-terminated polyethylene glycol; acrylate-based copolymer such as methacrylic acid, methacrylamide, hydroxymethyl methacrylate; ethylene vinyl alcohol copolymer; silicone based copolymer of aryl or alkyl siloxane and at least one repeating unit; polyurethane; heparan sulfate; RGD peptide; polyethylene oxide; chrondroitin sulfate; YIGSR peptides; keratan sulfate; VEGF biomimetic peptide; perlecan (heparan sulfate proteoglycan 2); Ile-Lys-Val-Ala-Val (IKVAV) containing laminin alpha-1 chain peptide; modified heparin; fibrin fragments.

According to the invention is also disclosed an apparatus for forming a linear channel in nervous tissue for implantation of a medical device or other object which is insufficiently physically stable for direct insertion into neural tissue. The channel-forming apparatus comprises or consist of an oblong rigid pin having a front end and a rear end and a layer comprising or consisting of dry gel forming agent of the invention on a pin section extending from the front end in a distal direction and enclosing said section. In this application, by gel forming agent is understood a dry agent that forms a gel by contact with an aqueous fluid such as an aqueous body fluid. The water content of the layer of gel forming agent is less than 20% by weight, in particular less than 10% by weight, most preferred less than 5% or 2% by weight. A particularly preferred gel forming agent is gelatin.

The pin is preferably rotationally symmetric, in particular cylindrical, and comprises a central axis. "Cylindrical" includes a cylinder with a ellipsoid or similar rounded base. It is preferred for the layer of gel forming agent to have a length at least corresponding to the depth of the channel formed in the tissue. It is preferred for the pin to be of greater length than the length of the channel, such as of a length greater by 10% or 30% or more. The pin is made of a rigid material, in particular of a material as rigid as possible, so as to provide a device of radial dimensions as small as possible to minimize damage to the tissue into which is inserted. Particularly suited materials include steel, titanium, tungsten, hafnium, and iridium. Another particularly suited material is acrylate or epoxy polymer, preferably reinforced with fiber, in particular carbon fiber.

According to a preferred aspect of the invention, the channel forming apparatus comprises a fluid passage in the pin in form of an axially disposed channel accessible at a rear portion thereof not covered by gel forming agent. The passage or channel extends from the rear to the front end of the pin and forms an opening at the front face thereof or near the front face thereof.

According to a preferred embodiment of the invention the axially disposed channel comprises one or more radially extending channels opening at the cylindrical face of the pin but not extending through the layer of gel forming agent disposed thereon. According to a preferred modification lateral openings of the radial channels can be plugged by a material dissolvable by body fluid. According to another preferred modification the distal end of the axially extending channel can be plugged in the same manner or permanently. The provision of the axially and/or the radially extending channels allows injection of aqueous fluid to affect the structure of the gel formed around the pin. The provision of such channels furthermore allows injection of aqueous fluid comprising a pharmacologically active agent or sequential injection of fluids comprising different pharmacologically active agents. It does furthermore allow the injection of low-viscosity aqueous gel, which gel can comprise a pharmacologically active agent or other agent, for instance a nutrient such as glucose.

Alternatively or additionally, pharmacologically active agents can be incorporated in the layer comprising or consisting of gel forming agent. Preferred pharmacologically active agents comprise coagulant, anticoagulant, antibiotic, osmotic pressure adjusting agent, anti-inflammatory agent, nutrient, factor stimulating growth, factor stimulating cell differentiation, hormone. The provision of such channels, in particular an axial channel, also allows injection of viable cells.

According to another preferred aspect of the invention, the apparatus comprises electrode means and/or optical fiber means, either in addition to the axially disposed channel or independent thereof. The electrode and/or optical fiber means allow monitoring of electrical activity and provide visual control during insertion and gel formation.

According to an additional preferred aspect of the invention, the layer comprising or consisting of dry gel forming agent can be covered by a layer of material reducing friction with tissue during implantation. Provision of the friction reducing layer avoids or reduces injury caused by the implantation procedure. It may also reduce the risk of carrying with it cells, such as meninges fibroblasts, from a superficial tissue to a deeper tissue during implantation. Suitable friction-reducing coating materials include polyvinyl alcohol, chitin, hyaluronic acid, and agents disclosed in US 2008234790 A1, which is incorporated herein by reference.

The aqueous biocompatible gel in the nervous tissue channel of the invention can consist of more than one layer, in particular two layers or three layers. The layers may be oriented radially and/or axially in respect of the channel. The layered gel can differ in respect of their physical properties, in particular in respect of their swelling properties and/or their biological degradation properties and/or their content of pharmacologically active agents.

According to a preferred embodiment of the invention the gel comprises an outer layer and an inner layer disposed axially, the outer layer being physically more stable than the inner layer, for instance by being cross-linked in contrast to the not cross-linked inner layer.

According to a still other preferred embodiment a physically stable axially disposed outer gel layer, such as a cross-linked layer, surrounds an inner layer of low-viscosity gel or a layer of aqueous liquid. The aqueous gel layers can be formed by insertion into nervous tissue of a pin covered by two or more layers disposed one on another radially or adjacent in an axial direction or both.

A medical device or other object implanted according to the invention into neural tissue via a channel filled with a gel, in particular gelatin gel, of the invention does not reduce or at least not substantially reduce neuronal density in neural tissue adjacent to the implant.

According to the present invention implantation of a medical device or other object into neural tissue via a channel filled with a gel, in particular gelatin gel, of the invention reduces bleeding from the channel walls.

According to the present invention is also provided a method of providing an oblong linear channel in nervous tissue of a person or a mammal for implantation of a medical device or other object into said tissue by insertion into the channel, the device being insufficiently physically stable for implantation by direct insertion into the tissue, the method comprising: providing a channel-forming apparatus comprising a rotationally symmetric, in particular cylindrical, rigid pin of a length exceeding the length of the channel to be provided and having a front end and a rear end, a section of the pin extending from its front end towards its rear end of a length corresponding to at least the length of the channel enclosed by a layer of gel forming agent or comprising gel forming agent, wherein a gel forming agent is a dry agent capable of forming an aqueous gel on contact with aqueous body fluid, the layer of gel forming agent or comprising gel forming agent comprising less than 20% by weight of water, preferably less than 10% by weight, in particular less than 5% or 2% by weight; inserting the pin into nervous tissue with its front end foremost; allowing aqueous gel to be formed around the pin by contact of gel forming agent with aqueous body fluid; withdrawing the pin from the gel; wherein the pin is sufficiently rigid to allow it to be inserted into nervous tissue in absence of the layer comprising or consisting of gel forming agent.

It is within the ambit of the invention to provide the cylindrical wall of the pin with two or more layers of gel forming agent and for the gel forming agent of different layers to differ in their structure and properties, such as to be of different biological stability or forming gels of different strength. The two or more layers can be disposed on each other and/or adjacent to each other in an axial direction. The gel formed in the channel of the invention will reflect the disposition of the layers of gel forming agent or comprising gel forming agent on the pin. For instance, a first layer covering a portion of the cylindrical wall of the pin covered, in turn, by a second layer will form, on contact with body fluid upon insertion of the pin into nervous tissue, a centrally disposed cylindrical gel section surrounded by a tubiform gel section.

In this application, "other object" comprises living cells and cell clusters, in particular in frozen aqueous suspension.

According to a preferred aspect of the invention is disclosed a method of the aforementioned kind which includes identifying the position of a target in the nervous tissue in respect of which the front end of the channel in the tissue is desired to be disposed, the method comprising:
 i) providing a channel-forming apparatus comprising an oblong rigid pin having a front end and a rear end, a pin section extending from the front end in a distal direction covered with gel forming agent;
 ii) providing access to the tissue;
 iii) locating the spatial disposition of a target in the tissue;
 iv) optionally locating a spatial disposition near the target;
 v) locating the spatial disposition of an insertion point for the apparatus on an access face of the tissue;
 vi) disposing the front end of the pin on the insertion point while aligning the pin in a direction corresponding to the insertion path defined by a straight line connecting the insertion point and the target or the spatial disposition near the target;
 vii) inserting the front end of the pin into the tissue along the insertion path to a depth defined by the target or the spatial position;
 viii) allowing sufficient time to pass for a gel to be formed around the pin;
 ix) optionally procuring information about gel formation by imaging techniques or by recording neural activity;
 x) withdrawing the pin from the gel.

A preferred device for implantation is a microelectrode of insufficient physical stability. Optionally, the microelectrode can be one comprised by a bundle or array of microelectrodes.

A particularly preferred device for implantation is an oblong microelectrode. For a given diameter the risk of bending of a microelectrode during insertion increases substantially with its length. A preferred object for implantation is a living cell or cell cluster, in particular in a frozen aqueous suspension.

Suitable materials for microelectrodes are known in the art and comprise gold, platinum, tungsten, titanium, copper, silver, aluminum, and their alloys. Other suitable materials for microelectrodes comprise i) electrically conducting polymers and ii) electrically non-conducting polymers including polymers forming natural fibers, a core of such polymer being covered by an electrically conducting metal or metal alloy, such as by a metal or metal alloy mentioned in the foregoing.

In the context of the invention "oblong" refers to a microelectrode in form of a tiny wire having a front (distal) end and a rear (proximal) end of a length that is a multiple of its diameter, such as a multiple of 5 or 10 or 50 or 200 or 500 and more. The diameter of a microelectrode for use in the invention can be from the nanometer range, such as from 100 nm or 500 nm or from 1 μm or 2 μm or 5 μm, up to 20 μm or 50 μm or 100 μm. A microelectrode particularly suitable for use in the invention is one which is not sufficiently physically stable for implantation into nervous tissue by inserting it into a face of the tissue that is accessible from outside and has been created by surgery. "Not sufficiently physically stable" indicates that insertion of such a microelectrode with its front end foremost into nervous tissue risks bending its front end away from the desired path of insertion. This may result in the electrode front end not to be disposed as desired, for instance not disposed in a desired spatial relationship to a nerve cell or a cluster of nerve cells or other optically or radially distinguishable component of nerve tissue. Additionally, "not sufficiently physically stable" includes compressible and/or resiliently elastic microelectrodes.

Another preferred device for implantation is an optical fiber of insufficient physical stability or rigidity for direct insertion into soft tissue sharing one or more physical features of said microelectrode but not its electrical conductivity. Except for its end faces allowing radiation to enter and to exit an optical fiber may however be covered by a layer of electrically conducting material thus being capable of functioning as a microelectrode.

Still another preferred device for implantation is a microprobe or micro-sensor of insufficient physical stability or rigidity for direct insertion into soft tissue.

The method of the invention, independent of whether it comprises or not identification of the position of a target in the nervous tissue in respect of which the front end of the channel is desired to be disposed, may comprise an electrically conducting pin, which may be additionally used as a temporary electrode, the pin comprising or consisting of a metal, a metal alloy or an electrically conducting polymer or other conducting non-metallic material such as carbon, preferred metals being selected from the group consisting of gold, silver, copper, platinum, iridium, titanium, chromium, tungsten, aluminum, and their alloys, any of tungsten, iridium and stainless steel being particularly preferred; a protein or carbohydrate or a mixture thereof as an agent capable of forming a gel in contact with body fluid, preferred agents being selected from the group consisting of gelatin, hyaluronic acid and its pharmacologically acceptable salts, chemically modified gelatin and hyaluronic acid, such as by cross-linking and/or partial hydrolytic degradation, native gelatin being particularly preferred; an electrically conducting lead attached to or near the rear end of the pin in an electrically conducting fashion; a voltage monitoring device or a source of electric power attached to the lead; a pharmacologically active agent comprised by the agent capable of forming a gel on contact with aqueous body fluid, preferably selected from the group consisting of coagulant, anti-coagulant, antibiotic, osmotic pressure adjusting agent, anti-inflammatory agent. According to still another preferred aspect of the invention the device is or comprises a microelectrode and/or an optical fiber, a microprobe or microsensor such as an insulin or glucose probe, capable of monitoring/sensing a concentration of a biological agent such as insulin or glucose in the tissue.

Alternatively, the method of the invention can comprise a non-conducting substantially stiff pin, in particular a pin of a polymer material such as polycarbonate, polystyrene, polyvinylchloride, and polyacrylate. The pin may consist of or be covered by a material facilitating withdrawal upon formation of the aqueous gel. Parylene C, silicon rubber and Teflon® are materials particularly useful for this purpose.

According to a preferred aspect of the invention is disclosed a method for implantation of living cells into neural tissue, comprising:
  i) providing an aqueous suspension of living cells in a syringe or pipette or other device for injection of suspensions;
  ii) forming a linear implantation channel in the tissue according to the method of the invention of forming a channel in nervous tissue of a person or a mammal for implantation of a medical device into said tissue, including or not identification of the position of a target in the nervous tissue in respect of which the front end of the channel is desired to be disposed,
  iii) inserting the syringe needle to a desired depth into the implantation channel;
  iv) injecting the aqueous suspension of living cells into the implantation channel;
  v) withdrawing the syringe or pipette; with the proviso that injection can be made prior to and/or during withdrawal.

According to a preferred aspect of the invention, the syringe needle can be covered with material forming a gel on contact with aqueous body fluid, for instance gelatin, and the linear implantation channel of the invention can be formed by using an accordingly covered syringe needle as pin.

According to another preferred aspect of the invention is disclosed a further method for implantation of living cells into neural tissue, the method including identifying the position of a target in the nervous tissue in respect of which the front end of the channel is desired to be disposed, comprising:
  i) providing a frozen aqueous suspension of living cells attached to the tip of an insertion bar;
  ii) forming a linear implantation channel in the tissue according to the method of the invention of forming a channel in nervous tissue of a person or a mammal for implantation of a medical device into said tissue, including or not identification of the position of a target in the nervous tissue in respect of which the front end of the channel is desired to be disposed,
  iii) inserting the bar with its tip foremost to a desired depth into the implantation channel;
  iv) allowing the frozen suspension to thaw;
  v) withdrawing the bar.

According to still another preferred aspect of the invention is disclosed a linear, preferably cylindrical, channel in nervous tissue of a person or animal for implantation of a medical device, the channel filled with a gel formed by contact of body fluid with a dry gel forming agent of the invention, in particular a member of the group consisting of gelatin, hyaluronic acid and salts thereof, chemically modified gelatin, chemically modified hyaluronic acid and salts thereof. Chemically modified gelatin and chemically modified hyaluronic acid comprise partially hydrolytically degraded gelatin and hyaluronic acid and/or cross-linked gelatin and hyaluronic acid. It is however possible but not preferred for the channel to be of other form than cylindrical; channels of square or other radial section can be provided by using correspondingly formed pins. A cylindrical channel can comprise two or more cylindrical layers of aqueous gel of same diameter as the channel or a cylindrical central layer of aqueous gel is surrounded by a peripheral layer of aqueous gel. The term "cylindrical channel" comprises cylindrical channels of ellipsoid form in a radial section.

The invention will now be explained in greater detail by reference to a number of preferred embodiments illustrated in a rough drawing, which is not to scale. Radial dimensions are greatly exaggerated. All figures are axial or radial sections.

BRIEF DESCRIPTION OF THE DRAWING(S)

FIGS. 1a-1f: illustrate the method of the invention for providing a channel in nervous tissue of a person or a mammal for implantation of a medical device and a channel so produced, the method including identification of the position of a target in the nervous tissue in respect of which the front end of the channel is desired to be disposed; FIGS. 1c-1f illustrate a variation of the method of the invention in which the position of the target is not identified by radiation means;

FIGS. 1g, 1h: illustrate the method of the invention for implanting a microelectrode into nervous tissue by inserting it into the channel provided by a method of the invention, and a microelectrode so implanted;

FIG. 2: illustrates a microelectrode implanted according to the method of the invention positionally fixed in neighboring osseous tissue;

FIG. 3: illustrates an apparatus according to the invention for forming a channel in nervous tissue for insertion of a microelectrode or other device;

FIG. 4: illustrates the microelectrode of FIGS. 1g-1j;

FIG. 5: illustrates an apparatus according to the invention for forming a channel in nervous tissue for insertion of a microelectrode or other device, the apparatus comprising an optical fiber;

FIG. 6: illustrates an apparatus according to the invention for forming a channel in nervous tissue for insertion of a microelectrode or other device, the apparatus comprising an optical fiber and an electrode;

FIGS. 7 and 7a: illustrate an apparatus according to the invention for forming a channel in nervous tissue for insertion of a microelectrode or other device in axial A*-A* (FIG. 7; FIG. 7a showing an enlarged portion thereof) section, the apparatus comprising, in addition to a cylindrical pin covered with dry gelatin and comprising optical fiber and electrode means, an axially extending passage in the pin for injection of fluid material into the channel from the opening of the passage at the distal face of the apparatus;

FIGS. 8, 8a, 8b, 8c: illustrate an apparatus according to the invention for forming a channel in nervous tissue for insertion of a microelectrode or other device in axial A-A (FIG. 8; 8a showing an enlarged portion thereof) and radial B-B (FIGS. 8b, 8c, further enlarged) section, the apparatus comprising, in addition to a cylindrical pin covered with dry gelatin and comprising optical fiber and electrode means, an axially extending passage in the pin for injection of fluid material into the channel from the opening of the passage at the distal face of the apparatus, and further comprising passages extending radially from the axially extending passage, the radially extending passages of a variety of the apparatus illustrated in dry FIG. 8c being plugged;

FIGS. 9, 9a, 9b, 9c: illustrate an apparatus according to the invention corresponding to that of FIGS. 8, 8a, 8b, 8c, provided with a layer of friction reducing agent on the gelatin layer;

FIG. 10: illustrates a variety of the apparatus of FIG. 9 and in the same section, the gelatin layer being covered by a first, friction reducing layer extending from the distal end of the pin in a proximal direction and by a second layer comprising anticoagulant extending from the proximal end of the friction reducing layer in a proximal direction;

FIGS. 11, 11a, 11b, 11c: illustrate four embodiments of cylindrical pins of the invention covered with one or more layers of dry gel forming agent used in the production of corresponding cylindrical channels in nervous tissue filled with aqueous gel, in an axial (channel axis) section;

FIG. 12, 12a, 12b, 12c: illustrate four embodiments of the cylindrical channel of the invention in nervous tissue of filled with one or more layers of aqueous gel, produced by implantation of the pins of FIGS. 11, 11a, 11b, 11c, respectively, in an axial (channel axis) section.

DESCRIPTION OF PREFERRED EMBODIMENTS

Example 1. Determination of Position of Target, Front (Bottom) End of Channel, Rear (Top or Open) End of Channel, Providing Guiding Information for Insertion of Channel-Forming Apparatus FIG. 1 is a rough representation of a section of a mammal brain 1 with adjacent portions of skull bone 2 and dura mater 3. A through bore 5 has been provided in the skull bone 2 through which a face 6 of the brain tissue 1 can be accessed after removal of a portion of the dura mater 3. In the brain tissue 1 a number of neural cells or rather cell clusters comprising 100 or more cells 4 are shown. One of them 4' has been identified as a desired target for nervous cell potential with a microelectrode. The location of the target neural cell/cell cluster 4' is determined by employing a combination of two imaging systems such as Computer Tomography (CT) 11 and Magnetic Resonance Imaging (MRI) 12 electrically connected with and controlled by a control unit 13. Based on the location information a microprocessor of the control unit 13 determines an insertion track 9 for a channel forming apparatus (20, FIG. 3), which is visualized by a laser 10 beam controlled by the control unit 13. The control unit 13 additionally determines a point 7 on the track near the target neural cell 4' cluster corresponding to the distal end of a channel (23', FIG. 2) to be formed defining the insertion depth of the channel forming apparatus (20, FIG. 3). The point 8 on the insertion track 9 where the laser beam hits the free face 6 of the brain tissue 4 is also determined. Point 8 represents the point of insertion into brain tissue 1 of the channel forming apparatus (20, FIG. 3).

Example 2. First Embodiment of a Channel-Forming Apparatus of the Invention and Manufacture Thereof An embodiment of the channel forming apparatus 20 of the invention is shown in FIG. 3 in axial A-A section. The channel forming apparatus 20 comprises a stiff cylindrical pin 21 of a rigid material and a layer 22 of gelatin on a portion of the pin 21 extending from its front (distal) end 21' in the direction of its rear (proximal) end 21". The layer of gelatin 22 can be substituted by a corresponding layer of another agent capable of forming a gel on contact with body such as hyaluronic acid or PEG or a combination of such agents. The axial extension of the layer 22 corresponds to at least the depth of the channel to be formed. The diameter of the pin 21 is smaller than the diameter of the channel to be formed and should be kept as small as possible. The thickness of the layer 22 on the pin is determined by the desired width of the channel to be formed. The pin 21 should be tapering towards its distal end, such as by ending in a sharp or rounded tip, in particular a conically rounded tip. The material of the pin 21 is not critical but should provide good adherence for the layer of 22 of gelatin or other agent capable of forming a gel on contact with aqueous body fluid. On the other hand, the material of the pin or a material covering the surface of the pin should easily release the aqueous gel formed upon contact of the dry gel forming agent with aqueous body fluid, that is, should not provide good adherence for the so formed aqueous gel. The use of a poly-fluorinated material such as Teflon® covering the pin 21 constitutes an acceptable compromise. Other useful materials include silicones of various kind. Useful pin 21 materials include steel, aluminum, polycarbonate, polyester, glass, ceramics but also titanium, gold, platinum and alloys thereof. They may be covered by, for instance, a thin layer of poly-fluorinated material or a silicone or their surface may be silanized.

The channel forming apparatus 20 can be manufactured, for instance, by providing an aqueous solution of gelatin and a pin 21 of stainless steel. The viscosity of the gelatin solution is controlled by temperature and concentration so as to make it visibly viscous but not gelling. The pin 21 is dipped into the gelatin solution, then withdrawn, disposed horizontally, and rotated. Drying of the gelatin solution on the pin 21 can be accelerated by applying heat and/or vacuum.

The dipping step is repeated until a gelatin layer 22 of desired thickness has been formed on the pin 21. To avoid dissolution of dry gelatin the pin 21 is quickly withdrawn from the gelatin solution.

In another method of manufacture of the channel forming apparatus gelatin or other agent capable of forming a gel on contact with water is applied to the pin 21 by spraying with a corresponding aqueous solution.

In still another method of manufacture of the channel forming apparatus a mould of desired form is used for the manufactures of the channel forming apparatus. In a preferred embodiment two sheets of acrylic material (Plexiglass®) each comprising a hemi-cylindrical moulding section of same size constituting a cylindrical mould are mounted in an abutting disposition with their axes aligned around a cylindrical pin of the invention, the axis of which is centered in the mould. The sheets are kept in the abutting disposition by a number of screws disposed peripherally of the mould. The radial dimension of the mould is slightly larger than that of the pin. At one axial end of the mould a channel is provided through which a concentrated aqueous solution of the gel forming agent is injected into the space between the pin and the mould walls. Injection is made at a temperature at which the solution is not gelled. The sheets of the mould then are slowly released by loosening the screws to provide access of air for drying. After drying to a water content of about 2% by weight the pin covered with dry gelling agent is removed from the mould. The gelling agent can in turn be coated with a material such as Kollikoat® retarding contact of the dry gelling agent with aqueous body fluid and thus the onset of gelling as well as the end thereof.

Example 3. Forming an Implantation Channel

A preferred embodiment of forming an implantation channel of the invention is shown in FIGS. 1b through 1f.

Figure 1C:
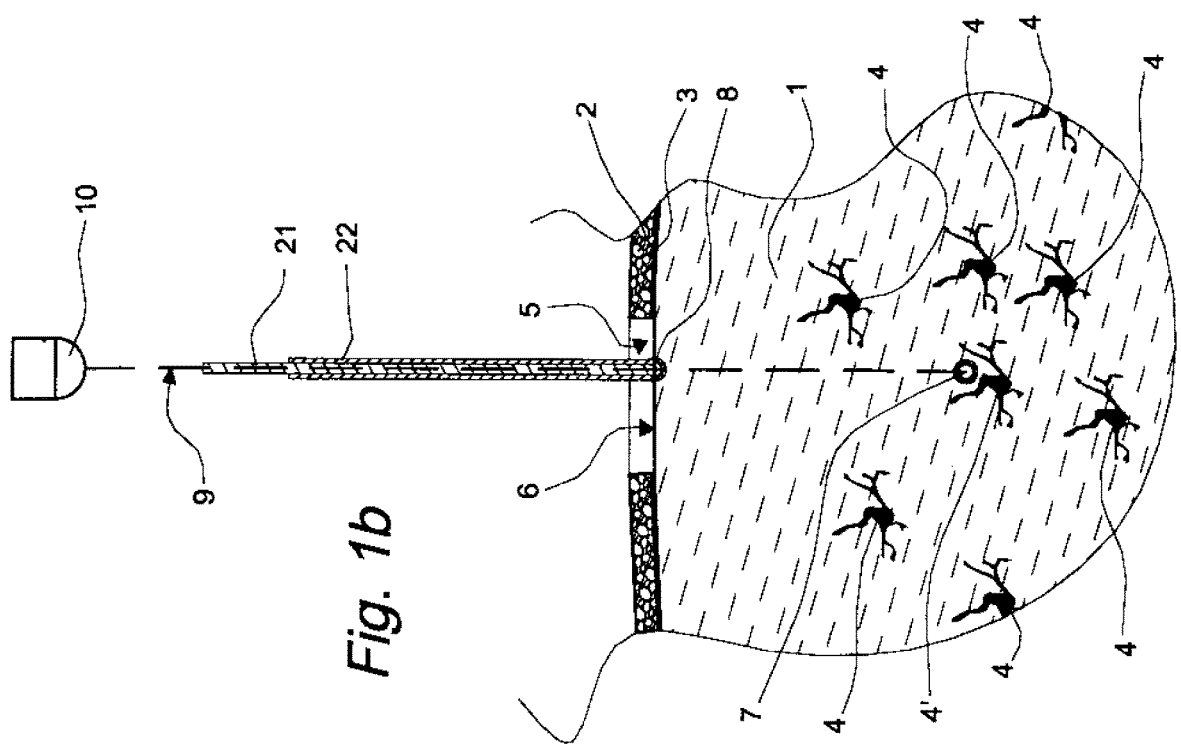

A channel-forming apparatus 20 of the invention is positioned with its front end 21' at insertion point 8 on the accessible brain tissue 4 surface 6 and with its axis A-A aligned with the insertion track line 9 (FIG. 1b). The apparatus 20 is then inserted into the tissue 4 along the track line 9 by applying pressure on its rear section lacking a gelatin layer 22. Application of pressure and insertion may be manually or by using an appropriate micromanipulator (not shown). The apparatus 20 is inserted into the desired depth, that is, until its front end has reached the front end 7 of the insertion track or path (FIG. 1c). Insertion should be as fast as possible to avoid dissolution of gelatin in the layer 22 by aqueous body fluid during insertion. Upon full insertion the apparatus 20 is left in the fully inserted position (FIG. 1c) until the gelatin layer 22 has been fully dissolved by aqueous body fluid and a tubiform layer of gelatin gel 23 formed around the pin 21 (FIG. 1d). The combination of pin 21 and tubiform layer of gelatin gel 23 constitute a pre-channel visualized in FIG. 1d by its contour 24. Since the axial length of the gelatin layer 22 exceeded the depth of insertion and thus the axial extension of its contact with aqueous body fluid, a proximal terminal portion 22' of the gelatin layer 22 was not dissolved. In the following step the pin 21 is withdrawn (direction R) from the gel 23 along the insertion path 9. Withdrawal of the pin 21 reduces the volume of the pre-channel by the volume of the pin 21 so as to form a channel of the invention visualized in FIG. 1e by its contour 24'. FIG. 1f (enlarged) illustrates an initial phase of withdrawal of pin 21 in which a distal terminal portion of the gelatin gel 23' has shrunken to the diameter of the channel 24' and adopted cylindrical form while the adjacent portion of the gelatin gel 23 is still tubiform. Upon full withdrawal an implantation channel 24 filled with gelatin gel 23' has been formed (FIG. 1e). The amount of gelatin for forming channel 24 can be reduced when using a physically stabilized microelectrode comprising a matrix dissolvable or degradable in aqueous body fluid.

By using cross-linked gelatin or other cross-linked gel-forming agent, it is possible to retain upon withdrawal of the pin a channel in the tissue filled with aqueous body fluid. The channel is surrounded by a cylindrical wall of cross-linked gel. It is particular useful for insertion of a not physically stabilized microelectrode or other probe or sensor of the invention into soft tissue.

Example 4. Second Embodiment of the Apparatus According to the Invention Additionally Comprising Optical Fiber Means A second embodiment 50 of the apparatus according to the invention is shown in FIG. 5. Its pin 51 of polyacrylate encloses a centered (axis A'-A') optical fiber 55 extending from the front end 51' of the pin in a proximal direction leaving the pin near the other end thereof so as to emerge in a skew angle from the cylinder wall of the pin. Alternatively the optical fiber may extend through the entire pin in a centered disposition and leave the pin at its proximal end. The side wall of the pin 51 is covered by a layer 51 of dry gelatin extending from the distal end 51' to a position distally of where the optical fiber 55 emerges from the cylinder wall. The front end face of the pin 51 is not covered by gelatin. This allows radiation to emerge from the front end of the optical fiber 55 unimpeded and/or inspection of tissue disposed in front of the pin's 51 front end.

Example 5. Third Embodiment of the Apparatus According to the Invention, Additionally Comprising Optical Fiber and Electrode Means A third embodiment 60 of the apparatus of the invention is shown in FIG. 6. It is a modification of the second embodiment in that it further comprises an electrode function. The electrode function is provided by a conductive layer 66 of gold on the pin 61, which encloses an optical fiber 65 disposed centrally and which shares its central axis with that (A"-A") of the pin 61. Except for a short portion near its distal end the gold layer 66 is electrically insulated by a lacquer 67. The gold layer 66 is electrically connected with a control unit (not shown) by an insulated lead 68 attached to the gold layer 66 at the proximal end thereof. A layer 62 of dry gelatin covers insulated and non-insulated portions of the gold layer 66.

Example 6. Microelectrodes

A wide assortment of microelectrodes can be used in the invention. Their design does not pertain to the invention other than that they should be oblong and generally suitable for implantation by the method of the invention. FIG. 4 illustrates such a microelectrode 30 consisting of a waveform thin metal wire 31 having a free front (distal) end and attached at its other (rear, proximal) end to a coupling element 32; the coupling element is preferably disposed at considerably distance from the skull. To the coupling element 32 may, for instance, be in turn attached a thin insulated metallic lead 33 in conducting relation with the wire 31, which may also be electrically insulated except for at its front end, which acts as an active electrode tip. The physical stability of the microelectrode 30 is insufficient to allow its direct insertion into brain tissue 1 due to deflection from its intended path of insertion caused by its flexibility and non-homogenous neural tissue. Diameters of microelectrodes for use in the invention preferably are in the sub-mm range, in particular in the sub-200 µm range. Lengths of microelectrodes for use in the invention are not critical and can be up to 100 mm and more.

Example 7. Microelectrode Implantation

Implantation of a microelectrode 30 into brain tissue is shown in FIGS. 1g and 1h. The microelectrode 30 is initially positioned above the channel 24' (identified in the Figures by its contour) with its free front end adjacent to the open end of the channel 24', approximately aligned with the central axis B-B (FIG. 1e) of the channel 24', then inserted (direction F) into the channel 24' partially (FIG. 1g) and, finally fully (FIG. 1h). Due to the nature of the gel 23' radial errors of microelectrode 4 insertion can be corrected during insertion or by partial withdrawal and re-insertion. Other devices such as optical fibers can be implanted by the same method.

Example 8. Implanted and Positionally Fixed Microelectrode

For long-term use an implanted microelectrode 30 or other device can be positionally fixed. The principle of such fixation is shown in FIG. 2. With its electrode body 31 disposed in a desired position the coupling element 3 is held by a clamping holder 41 of resiliently flexible polymer mounted at a through bore in a lock 40 cemented to the skull bone 2 at the opening 5 thereof. This arrangement protects the wound in the skull from infection. Other devices can be fixed in a corresponding manner.

Example 9. Assessment of Implant Interaction with Neighboring Neural Cells

To evaluate the effect of gelatin surrounding implanted electrodes in the tissue, we compared the histological reactions 6 weeks in rat brains after implantation to an implanted flat (approximately 7 um thick, 140 um wide and 2.5 mm long) testing device made of SU-8 which was either embedded with a thin (5-10 µm) layer of gelatin or not.

Surgical procedure. All animal-related procedures were conducted in accordance with local and international ethical guidelines, with the permission of the Lund and Malmo Ethical Board, diary numbers M258-11. All implantations (n implantations=16) were made in female Sprague-Dawley rats (no. of rats=8, Taconic, Denmark) weighing 200-250 g. The animals were anaesthetized using intra-peritoneal injections of fentanyl (0.3 mg/kg body weight) and Domitor vet (medetomidin hydrochloride, 0.3 mg/kg) and placed in a stereotactic frame for surgery. A rostrocaudal incision in the skin was placed along the central suture of the skull to expose Bregma. An opening of about 2 mm diameter was made 1.0 mm caudally of Bregma and 2.3 mm laterally if the midline. The Dura mater was cut open using a forceps and a syringe. To facilitate handling and implantation, the testing device was mounted on a stainless steel guiding wire (length about 3 mm, diameter 50 µm) using a sucrose solution as an adhesive and then implanted into the cortex to a depth of 2.0 mm using a micromanipulator. Implantation of gelatin embedded testing devices in one hemisphere and non-embedded testing devices in the other hemisphere was made into rat (n=8) cerebral cortex. After rinsing the surface of the cortex with physiological saline to dissolve sucrose, the guides were retracted and removed and the openings in the skull filled using FujiChem silastic, tethering the implant to the skull. Afterwards the wounds were closed using surgical staples. The animals received subcutaneous injections of an antidote to the anesthesia (Antisedan, atipamezole hydrochloride, 0.5 mg/kg b.w.) as well as Temgesic (buprenorphine, 50 µg/kg b.w.) to reduce postoperative pain.

After six weeks the animals were anaesthetized with an overdose of pentobarbital (i.p) and trans-cardially perfused with 150-200 ml ice-cold 0.1 M phosphate buffer (PB), followed by 4% paraformaldehyde (PFA) in 0.1 M PB. The brains were postfixed in 4% PFA overnight and then soaked in 30% sucrose for at least 24 hours for cryopreservation. They were then serially sectioned in the horizontal plane at 30 µm, using a cryostat (Microm HM560). Sections were kept in antifreeze in a free-floating manner.

Astrocyte proliferation, recruitment of microglial cells and neuronal cell bodies were evaluated using standard free-floating immunohistochemical techniques (Lind et al 2013). In brief, the brain sections were reacted with primary antibodies overnight at room temperature. The primary antibodies used were rabbit polyclonal antibodies recognizing Glial Fibrillary Acidic Protein (GFAP, an astrocytic cytoskeleton protein 1:5000, Dako, Denmark) and mouse monoclonal antibodies recognizing either CD68/ED1 (expressed by activated microglia/macrophages, 1:100, Serotec, USA) or NeuN (expressed on neuronal nuclei 1:100, Millipore, USA). After repeated rinses with PBS, the brain sections were further incubated with Alexa488-conjugated antibodies for mouse IgG and Alexa594-conjugated antibodies for rabbit IgG (1:500, Invitrogen, USA) (2 h, dark, RT) and rinsed with PBS.

A DS-Ril Digital camera (Nikon Instruments, Japan) mounted on a Nikon Eclipse 80i microscope with a 10× objective (Nikon Instruments, Japan) was used for histological fluorescence image analysis. The images were acquired and analyzed using the NIS-Elements BR software 3.2 (NIS-elements, Nikon Instruments, Japan). Different evaluation methods were used for the different stainings. Manual counts were performed for neuronal NeuN stainings while fluorescence intensity measurements were used for the glial markers GFAP and ED1 as described previously (Lind et al, 2013). The regions of interest (ROIs) were set at 0-50 µm (inner ROI) and 50-200 µm (outer ROI) from where the testing device had been placed. Brain sections disposed adjacent to a central portion of the testing device, corresponding to cortical lamina 4, were analyzed. To analyze neuronal cell survival, matched NeuN-positive cells were also counted in identical ROIs placed in naïve areas of the cortex and served as controls.

Wilcoxon matched-pairs signed rank test was used. P-values <0.05 were considered significant. Analyses were performed using the GraphPad Prism 5.02 software (GraphPad Software Inc., USA).

Significant astrocyte reactions as well as significant microglia responses were restricted to the inner ROIs of the implanted testing devices. Embedding testing devices in gelatin produced a statistically significant (p<0.05) reduction in microglial (ED1) density as compared to the non-embedded experimental group. In contrast no differences in respect of astrocyte density were observed between embedded and non-embedded testing devices. In all experimental groups the neuronal density in the inner and outer ROIs was compared with the neural density in naïve tissue. A significant (P<0.05) decrease of neuronal density was found around non embedded testing devices in comparison with the respective controls (naïve brain). In contrast neuronal density was not decreased in tissue surrounding gelatin embedded testing devices. No differences were observed in neuronal densities in any of the outer ROIs when compared to control. In conclusion, gelatin embedding significantly reduced the microglia responses to the implanted testing devices. Moreover, there was no tendency for a reduction in neuronal density adjacent to a gelatin embedded implant, while the number of neurons in the adjacent tissue in non-embedded implants is significantly reduced, indicating that gelatin embedding is neuroprotective.

Example 10. Fourth Embodiment of the Apparatus According to the Invention, Comprising Fluid Passage Means for Distal Injection of Fluid A fourth embodiment 70 of the apparatus of the invention having a proximal end 70", a distal end 70' and a lateral cylindrical face 78 is shown in FIGS. 7 and 7a. It is a modification of the third embodiment in that it further comprises fluid passage means in form of a centered (axis A'-A') axially extending channel 75 in the pin 71. The substantially cylindrical channel 75 is formed by a flexible tube 73 disposed in an axial bore of the pin 71, the inner wall of the tube 73 being covered by a thin layer 74 of a metal of high conductivity, such as silver or gold. The layer 74 can serve as an electrode but can also be omitted. The flexible tube 73 is preferably of a transparent polymer material such as acrylate, and thus capable of conducting light and functioning as an optical fiber. At a short distance from the proximal end 70" of the apparatus 70 the flexible tube 73 is bent away from the central axis A'-A' so as to emerge from the lateral face 78 of the pin 71. A layer 72 of dry gelatin covers a portion of the lateral face 78 of the pin 71 extending from the frontal end 70' towards near the distal end 70" but does not cover the distal front face 77 of the pin 71 and thus not the distal opening of the channel 75.

The channel 75 can be used for injection of fluid material emerging at the distal end thereof. The fluid material can be, for instance, an aqueous solution of a pharmacologically active agent such as a neurotransmitter, for instance dopamine or acetylcholine or histamine. The axial channel 75 can also be used for sucking up fluid material, in particular during withdrawal of the pin 71 from tissue. The fluid material may also contain a nutrient such as glucose and be oxygenated to reduce local hypoglycemia and ischemia upon implantation.

Example 11. Fifth Embodiment of the Apparatus According to the Invention Comprising Fluid Passage Means for Lateral Injection of Fluid A fifth embodiment 80 of the apparatus of the invention having a proximal end 80", a distal end 80' and a lateral cylindrical face 78 is shown in FIGS. 8, 8a, 8b. It is a modification of the fourth embodiment and comprises fluid passage means in form of a centrally disposed axially (axis A-A) extending channel 85 in the pin 81. The substantially cylindrical channel 85 is formed by a flexible tube 83 disposed in an axial bore of the pin 81, the inner wall of the tube 83 being covered by a thin layer 84 of a metal of high conductivity, such as silver or gold. The layer 84 can serve as an electrode but can also be omitted. The flexible tube 83 is preferably of a transparent polymer material such as acrylate, and thus capable of conducting light and functioning as an optical fiber. At a short distance from the proximal end 80" of the apparatus 80 the flexible tube 83 is bent away from the central axis A-A so as to emerge at the lateral face 88 of the pin 81. A layer 82 of dry gelatin of a water content of about 2% by weight covers the pin 81 extending from the proximal end 80' towards the distal end 80" but does not cover the distal front face 87 of the pin 81 comprising the distal opening of the flexible tube 83. Radially extending channels 86 are branching out from axial channel 85. They can be used for injection of fluid material emerging at the lateral face thereof upon transformation of the dry gelatin layer 82 to an aqueous gel. The fluid material can be, for instance, an aqueous solution of an agent accelerating the transformation of the dry gelatin layer 82 to an aqueous gel but may also or additionally comprise a pharmacologically active agent such as a neurotransmitter, for instance dopamine or acetylcholine or histamine.

The lateral channels 86 can also be used for sucking up fluid material, in particular during withdrawal of the pin 81 from tissue. The axially disposed channel 85 may be open or plugged at its distal end, the plug (not shown) consisting of a permanent material or one which is dissolved or degraded over time, such as cross-linked gelatin. Varieties of the fifth embodiment lacking the metal layer 84 are also comprised by the invention as are varieties lacking the flexible tube 83 or a portion thereof extending from the distal end 80' in a proximal direction; in such case the flexible tube 83 is substituted by a metal tube of high conductivity. The radially extending channels 86, such as four channels 86 disposed in a radial plane (FIG. 8b), extend from the axially disposed channel 85 through the flexible tube 83 and metal layer 84 walls but not through the dry gelatin layer 82. Peripheral terminal portions of the radially extending channels 86 may be plugged by plugs 87 (FIG. 8c) of a material dissolvable in an aqueous fluid; their provision facilitates covering the pin 81 with gelatin to form the dry gelatin layer 82 so as to avoid clogging the radially extending channels 86.

Example 12. First Modification of the Fifth Embodiment of the Apparatus According to the Invention Comprising a Friction Reducing Layer The embodiment 90 of the apparatus of the invention shown in FIGS. 9, 9a, 9b, 9c corresponds to the embodiment 80 of FIGS. 8, 8a, 8b, 8c except for that it comprises a friction reducing layer 89 on the dry gelatin layer 82' of same axial extension. Reference numbers 81' and 83' through 88' designate features of same kind as features 81 and 83 through 88 of the embodiment of FIGS. 8, 8a, 8b, 8c. Central axis A+-A+ corresponds to central axis A-A of FIG. 8. Reference numbers 90' and 90" designate the distal and proximal ends, respectively, of pin 81'. Section B+-B+ corresponds to section B-B of FIG. 8a.

Example 13. Second Modification of the Fifth Embodiment of the Apparatus According to the Invention Comprising a Friction Reducing Layer The embodiment 91 of the apparatus of the invention shown in FIG. 10 corresponds to the embodiment 80 of FIGS. 8, 8a, 8b, except for that it comprises two adjacent layers 92, 93 on the dry gelatin layer 82" of same axial extension as the total extension of layers 92, 93. The proximally disposed layer 92 comprises a coagulant preventing bleeding from the channel formed by insertion of the apparatus 91 into nervous tissue, whereas the distally disposed layer 93 is a friction reducing layer to minimize tissue damage during insertion of the pin 81". Reference numbers 82", 86" and 88" designate features of same kind as features 82, 86 and 88 of the embodiment of FIGS. 8, 8a, 8b. Central axis A++-A++ corresponds to central axis A-A of FIG. 8. Reference numbers 91' and 91" designate the distal and proximal ends, respectively, of pin 81".

Example 14. Embodiments of the Apparatus of the Invention of which the Pin is Covered with One or More Layers of Gel Forming Agent FIGS. 11, 11a, 11b, 11c illustrate, in a principal manner, an apparatus 100, 100a, 100b, 100c of the invention of which the cylindrical face of the pin 101, except for a portion extending for a short distance from the proximal end, is covered by of one or more layers of gel forming agent in varying disposition. In the embodiment 100 of FIG. 11 the pin 101 is covered by one layer 102 of gel forming agent. In the embodiment 100a of FIG. 11a, the pin 101 is covered by an inner layer 102 of gel forming agent covered by an outer layer 103 of gel forming agent. In the embodiment 100b of FIG. 11b the pin 101 is covered by a first layer 104 extending from the distal end thereof about halfway towards the proximal end, and by a second layer 102 abutting the proximal end of the first layer 104 and extending from there to near the proximal end of the pin 101. In the embodiment 100c of FIG. 11c, the pin 101 is covered by two inner layers 102, 104 disposed in the same manner as the layers of the embodiment of FIG. 11b, the inner layers 102, 104 being covered in turn by an outer layer 103.

Example 15. Embodiments of the Channel in Nervous Tissue of Invention Filled with One or More Layers of Aqueous Gel FIGS. 12, 12a, 12b, 12c illustrate, in a principal manner, a channel in nervous tissue 105 of the invention filled with one or more layers of aqueous gel 102*, 103*, 104* formed from a corresponding layer of dry gel forming agent 102, 103, 104 on the pin 101 of the apparatus 100, 100a, 100b, 100c of the invention illustrated in FIGS. 11, 11a, 11b, 11c, respectively, by contact with aqueous body fluid exuded from nervous tissue 105. The channel of FIG. 12 is homogeneously filled with aqueous gel 102*. The channel of FIG. 12a is filled with a central gel cylinder 102* surrounded by a tubiform gel cylinder 103* abutting the cylindrical tissue wall of the channel. A section extending from the bottom of the cylindrical channel of FIG. 12b to about half its height is filled with a first aqueous gel 104*, the remaining upper portion of the channel being filled with a second aqueous gel 102*. A central cylindrical portion of the channel of FIG. 12c is filled with first 104* and second 102* aqueous gel in the same disposition as in FIG. 12b, and is surrounded by a tubiform layer 103* of aqueous gel extending over the combined height of layers 102*, 104*. By adapting the properties of a gel forming agent an aqueous gel of, for instance, desired viscosity or resistance to biological degradation, can be designed. It is also possible to incorporate non-gelling agents, such as pharmacologically active agent and nutrients in a dry gel forming layer to produce a corresponding aqueous gel comprising the non-gelling agent (s).

What is claimed is:

1. A method of providing an oblong implantation channel in soft tissue of a person or a mammal for implantation of a medical device into said channel by insertion into the channel, the medical device being insufficiently physically stable for implantation by direct insertion into the tissue, the method comprising:

a) providing a channel-forming apparatus comprising a rigid pin having:
      (i) a length exceeding the length of the channel to be provided; having a front end and a rear end;
      (ii) a section, extending from its front end towards its rear end of a length corresponding to at least the length of the channel, that is enclosed by a layer of gel forming agent or a layer comprising gel forming agent; and
      (iii) a sufficient rigidity to allow it to be inserted into soft tissue in absence of the layer comprising of gel forming agent;
   b) inserting the pin into soft tissue with its front end foremost;
   c) allowing an aqueous gel to be formed around the pin by the contact of gel forming agent with aqueous body fluid; and
   d) withdrawing the pin from the gel
   e) inserting said medical device into said channel to a desired length.

2. The method of claim 1, wherein the pin comprises two or more layers comprising gel forming agent, wherein each of said two or more layers comprises a different gel forming agent.

3. The method of claim 1, wherein the pin is electrically conducting or comprises an axially extending electrical conductor or an optical fiber.

4. The method of claim 1, wherein the pin is of a metal or comprises a metal conductor or an electrically conducting non-metallic material such as an electrically conducting polymer or electrically conducting carbon.

5. The method of claim 1, wherein the pin comprises a centrally disposed axially extending channel.

6. The method of claim 1, wherein the pin is cylindrical.

7. The method of claim 1, wherein the gel-forming agent comprises less than 20% by weight of water.

8. The method of claim 1, wherein the gel forming agent comprises a gel-forming protein or a carbohydrate.

9. The method of claim 8, wherein the protein is selected from the group consisting of: gelatin, hyaluronic acid and salts thereof, chemically modified gelatin, chemically modified hyaluronic acid and salts thereof.

10. The method of claim 4, wherein a metallic lead is electrically coupled to the pin.

11. The method of claim 10, wherein the lead is for connection with a voltage monitoring device or with a source of electric power.

12. The method of claim 3, wherein the pin is electrically insulated except for at its front end.

13. The method of claim 1 wherein the gel forming agent or the layer comprising the gel forming agent comprises a pharmacologically active agent selected from the group consisting of: a coagulant, an anticoagulant, an antibiotic, an osmotic pressure adjusting agent, an anti-inflammatory agent, a nutrient, a factor stimulating growth, a factor stimulating cell differentiation, a hormone and cytokine.

14. The method of claim 1, wherein the medical device comprises a an optical fiber.

15. The method of claim 5, wherein said centrally disposed axially extending channel is designed for injection of aqueous fluid in an axial direction into the channel.

16. The method of claim 15, wherein the axially extending channel is in fluid communication with one or more radially extending channels allowing injection of said fluid in a radial direction into the channel.

17. A method of implantation of a medical device with a front end and a rear end sufficiently rigid for insertion into soft tissue, comprising:
   i) forming an implantation channel in the soft tissue by the method of claim 1; and
   ii) inserting the medical device with its front end foremost into said channel to a desired depth, wherein the medical device comprises a microelectrode.

18. A method for implantation of living cells into neural tissue, comprising:
   i) providing an aqueous suspension of living cells in a syringe with a needle or a pipette;
   ii) forming an implantation channel in the tissue filled with aqueous gel by:
      a) providing a channel-forming apparatus comprising a rigid pin having:
         (i) a length exceeding the length of the channel to be provided; having a front end and a rear end;
         (ii) a section, extending from its front end towards its rear end of a length corresponding to at least the length of the channel, that is enclosed by a layer of gel forming agent or a layer comprising gel forming agent; and
         (iii) a sufficient rigidity to allow it to be inserted into soft tissue in absence of the layer comprising or consisting of gel forming agent;
      b) inserting the pin into soft tissue with its front end foremost;
      c) allowing an aqueous gel to be formed around the pin by the contact of gel forming agent with aqueous body fluid; and
      d) withdrawing the pin from the gel;
   iii) inserting the syringe needle or pipette to a desired depth into the channel;
   iv) injecting the aqueous suspension of living cells into the implantation channel; and
   v) withdrawing the syringe needle or pipette, with the proviso that injection can be made prior to and/or during withdrawal.

19. A method for implantation of living cells into neural tissue, comprising:
   i) providing a frozen aqueous suspension of living cells attached to the tip of an insertion bar;
   ii) forming an implantation channel in the tissue filled with aqueous gel by:
      a) providing a channel-forming apparatus comprising a rigid pin having:
         (i) a length exceeding the length of the channel to be provided; having a front end and a rear end;
         (ii) a section, extending from its front end towards its rear end of a length corresponding to at least the length of the channel, that is enclosed by a layer of gel forming agent or a layer comprising gel forming agent; and
         (iii) a sufficient rigidity to allow it to be inserted into soft tissue in absence of the layer comprising or consisting of gel forming agent;
      b) inserting the pin into soft tissue with its front end foremost;
      c) allowing an aqueous gel to be formed around the pin by the contact of gel forming agent with aqueous body fluid; and
      d) withdrawing the pin from the gel; and
   iii) inserting the bar with its tip foremost to a desired depth into the channel;
   iv) allowing the frozen suspension to thaw; and
   v) withdrawing the bar.

* * * * *